US007370132B1

(12) United States Patent
Huang et al.

(10) Patent No.: US 7,370,132 B1
(45) Date of Patent: May 6, 2008

(54) LOGICAL-TO-PHYSICAL LANE ASSIGNMENT TO REDUCE CLOCK POWER DISSIPATION IN A BUS HAVING A VARIABLE LINK WIDTH

(75) Inventors: Wei Je Huang, Fremont, CA (US); Luc R. Bisson, San Jose, CA (US); Oren Rubinstein, Sunnyvale, CA (US); Michael B. Diamond, Los Gatos, CA (US); William B. Simms, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 188 days.

(21) Appl. No.: 11/281,718

(22) Filed: Nov. 16, 2005

Related U.S. Application Data

(63) Continuation-in-part of application No. 11/229,208, filed on Sep. 16, 2005, which is a continuation-in-part of application No. 10/431,994, filed on May 7, 2003, now Pat. No. 7,136,953.

(51) Int. Cl.
*G06F 13/40* (2006.01)
(52) U.S. Cl. .................. 710/307; 710/305; 710/310
(58) Field of Classification Search ........ 710/305–317, 710/60–61, 8–12; 713/310, 320, 322, 324, 713/501
See application file for complete search history.

(56) References Cited

U.S. PATENT DOCUMENTS

| | | | | |
|---|---|---|---|---|
| 6,079,024 | A | * | 6/2000 | Hadjimohammadi et al. .... 713/322 |
| 6,526,469 | B1 | * | 2/2003 | Drehmel et al. ............. 710/306 |
| 7,137,018 | B2 | * | 11/2006 | Gutman et al. ............. 713/323 |
| 7,188,263 | B1 | * | 3/2007 | Rubinstein et al. .......... 713/300 |
| 7,197,591 | B2 | * | 3/2007 | Kwa et al. ................. 710/307 |
| 7,254,647 | B2 | * | 8/2007 | Mann ......................... 709/250 |
| 2004/0088469 | A1 | * | 5/2004 | Levy .......................... 710/316 |

OTHER PUBLICATIONS

Gerald Holzhammer, Intel, Developer Update Magazine, "Creating a Third Generation I/O Bus," Sep. 2001, pp. 1-5, Copyright © Intel Corporation 2001.
Seh Kwa and Debra T. Cohen—Intel Corporation, "PCI Express, Architecture Power Management," Nov. 8, 2002, pp. 1-14, Copyright © Intel Corporation 2002.
PCI Express, "Base Specification," Revision 1.0a, Apr. 15, 2003, pp. 1-426, Copyright © 2002, 2003 PCI-SIG.
Ajy V. Bhatt (Technology and Research Labs, Intel Corporation), "Creating a Third Generation I/O Interconnect," pp. 1-8. Copyright © 2002.

* cited by examiner

*Primary Examiner*—Raymond N Phan
(74) *Attorney, Agent, or Firm*—Cooley Godward Kronish LLP

(57) ABSTRACT

A bus permits the number of active serial data lanes of a data link to be re-negotiated in response to changes in bus bandwidth requirements. In one embodiment, clock buffers not required to drive active data lanes are placed in an inactive state to reduce clock power dissipation.

18 Claims, 22 Drawing Sheets

LOGICAL-TO-PHYSICAL LANE ASSIGNMENT TO REDUCE CLOCK POWER DISSIPATION IN A BUS HAVING A VARIABLE LINK WIDTH

CROSS REFERENCE TO RELATED APPLICATIONS

This application is a continuation-in-part of U.S. patent Ser. No. 11/229,208, filed on Sep. 16, 2005, which is a continuation-in-part of U.S. Pat. Ser. No. 10/431,994 filed on May 7, 2003 now U.S. Pat. No. 7,136,953, the contents of which are hereby incorporated by reference.

BRIEF DESCRIPTION OF THE INVENTION

The present invention is generally related to bus power optimization for a bus comprised of a plurality of serial data lanes. More particularly, the present invention is directed towards optimizing bus power in peripheral component interfaces.

BACKGROUND OF THE INVENTION

There is an increasing need to reduce the power consumption of personal computers and other types of computing devices. A high-power consumption is undesirable because it increases the cooling requirements of the personal computer. Additionally, a high-power consumption is undesirable because it reduces the battery lifetime of mobile computers.

There are several components of a personal computer that draw significant amounts of power. First, the chip containing the central processing unit (CPU) draws power. Second, other chips, such as a graphics processing unit (GPU) or a bridge chipset, also consume power.

Additionally, a high-performance personal computer requires high-bandwidth data buses to transfer data between components. High-bandwidth data buses also consume a significant amount of power. The power required to operate a high-bandwidth data bus can be significant, particularly in the context of a mobile personal computer having a limited power budget.

Therefore, what is desired is an apparatus, system, and method for reducing bus power for a high bandwidth data bus.

SUMMARY OF THE INVENTION

An apparatus, system, and method is disclosed in which a data bus has a plurality of operable data lanes that may be associated to form a data link between components. A clock tree provides clock signals for the data lanes. In one embodiment clock buffers of the clock tree that are not required to service active data lanes are placed in a quiescent state.

One embodiment of a bus interface comprises: a plurality of serial data lanes in which each active serial data lane requires a clock signal for operation; a link state machine for implementing a bus protocol to associate the serial data lanes to form a data link with a corresponding bus interface of a link partner; a link width controller for adjusting the link width of the data link; a clock tree having a sequence of buffers and taps for distributing clock signals from a master clock to the plurality of serial data lanes; and a buffer controller controlling individual buffers in the clock tree; the bus interface having a mode of operation in which buffers not required to service active data lanes are placed in a quiescent state.

One embodiment of a method of reducing bus power for a data bus having a plurality of serial data lanes each requiring a clock signal for operation, comprises: associating a subset of the plurality of serial data lanes into a link with a link partner; and placing clock buffers not required to provide clock signals to active data lanes into a quiescent state.

One embodiment of a system comprises: a data bus having a plurality of serial data lanes capable of being associated into a link, the data bus in response to a re-negotiation signal configuring a set of the plurality of serial data lanes as active data lanes; and a clock tree for generating clock signals for each active data lane; wherein a link width of the bus is dynamically adjusted in response to changes in operating state of the system and clock buffers in the clock tree not required to drive active lanes are selected to be in a quiescent state.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
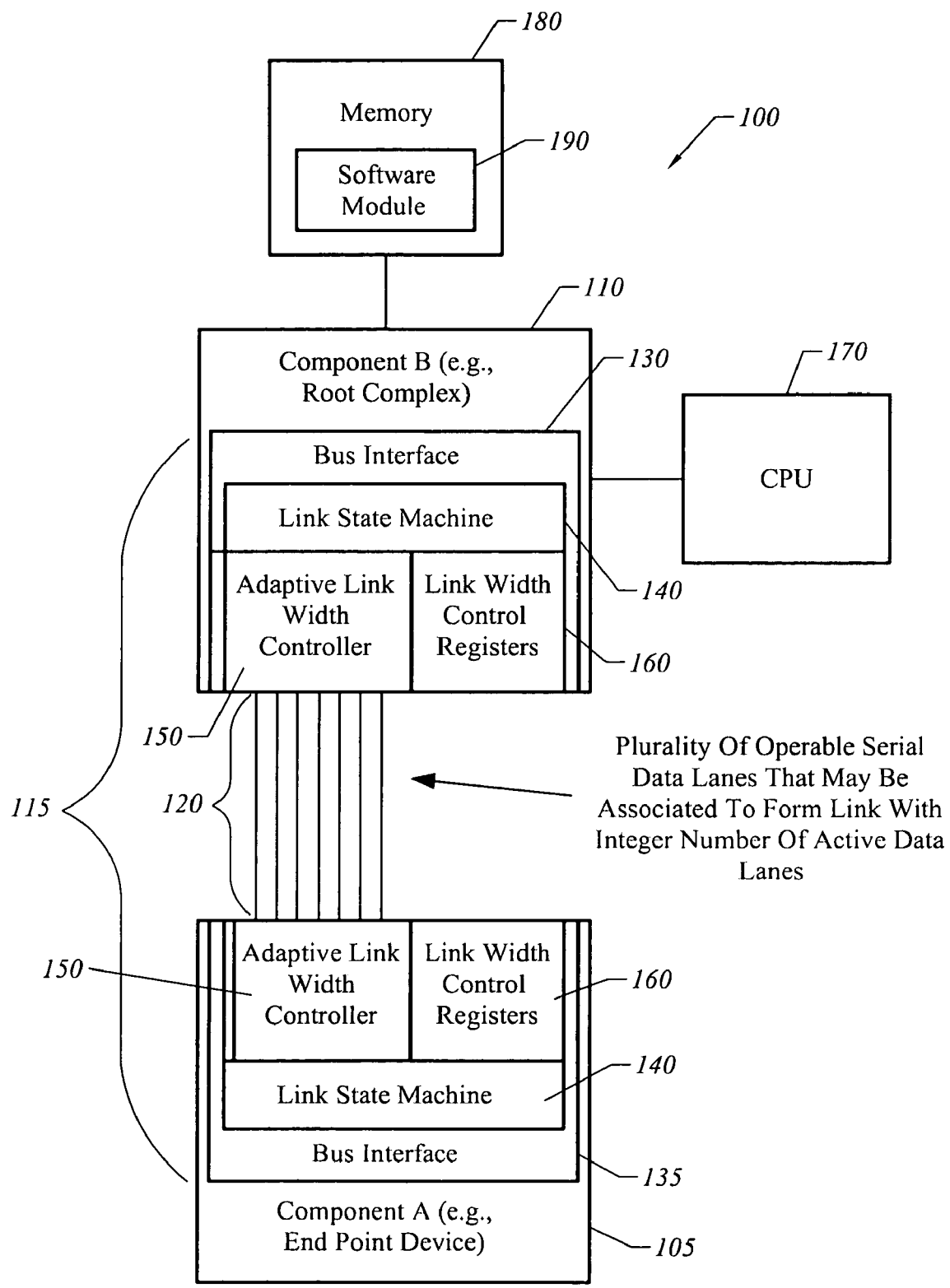
FIG. 1 illustrates a system including a bus apparatus in accordance with one embodiment of the present invention.

The present invention is directed towards an apparatus, system, and method for adaptively adjusting bus bandwidth. FIG. 1 is an illustrative block diagram of a system 100 in accordance with one embodiment of the present invention. Referring to FIG. 1, system 100 includes two components 105 and 110 that are communicatively coupled by a data bus 115 comprised of a plurality of serial data lanes 120 and bus interfaces 130 and 135.

In some embodiments, bus 115 is part of a system in which a first component 105 is an end-point device, such as a graphical processing unit (GPU). The other component 110 may correspond to a bridge, such as a root complex for peripheral devices. A CPU 170 and memory 180 having executable software instructions 190 may be coupled to component 110. However, it will be understood in the following description that bus 115 may be utilized in a variety of systems other than that illustrated in FIG. 1.

In one embodiment, each of the serial data lanes 120 corresponds to a pair of serial simplex data links to transmit and receive data. For example, each serial simplex data link may correspond to a high-speed differential pair with a transmitter disposed in one bus interface and a corresponding receiver in the other bus interface, with the high-speed differential pair having a data rate and associated data bandwidth. Each serial simplex data link may transmit an embedded data clock. A logical idle may be transmitted on the data lanes even when no data is being transmitted.

Each bus interface 130 and 135 includes its own local link state machine 140 for initializing a common data link between the components in which one or more of the data lanes are associated to form a common data link. With N active serial data lanes, where N is an integer, the link between the components is a "by N link" having N active lanes. The bandwidth of the link scales with the number of active lanes that are associated to form the link between the components. In particular, a transmission code, such as 8 bit/10 bit encoding, may be used to send serial data symbols on each data lane that represent bytes of a larger word of data transmitted on the bus, i.e., the word of data is encoded for transmission on one or more lanes of the bus.

Assuming that each data lane transmits data at the same rate, the bandwidth of the bus scales with the number of active lanes. Consequently, a by N link has a bandwidth proportional to its link width, where the link width is the integer number of active data lanes that are associated to form the common data link between the components. (The link width is also commonly referred to as the "bus width.") Additionally, since only the active lanes (i.e., powered lanes with embedded clocks) consume significant power, the power consumption of the bus also scales proportionally with the number of active lanes used in the link.

At least one of the bus interfaces includes an adaptive link width controller 150. Adaptive link width controller 150 acts to adjust the integer number of active lanes in accordance with changes in bandwidth requirements for the bus, i.e., it selects a subset of operable data lanes to be used to transmit/receive data, where the subset is in the range of 1 to K lanes, where K is the maximum integer number of operable data lanes supported by the interfaces. This permits the link width to be adapted to be a minimum number sufficient to provide the required bandwidth, thereby reducing the power consumption of the bus during time periods when a low bandwidth is sufficient while permitting the bus bandwidth to be increased during time periods when a high bandwidth is required.

Figure 2:
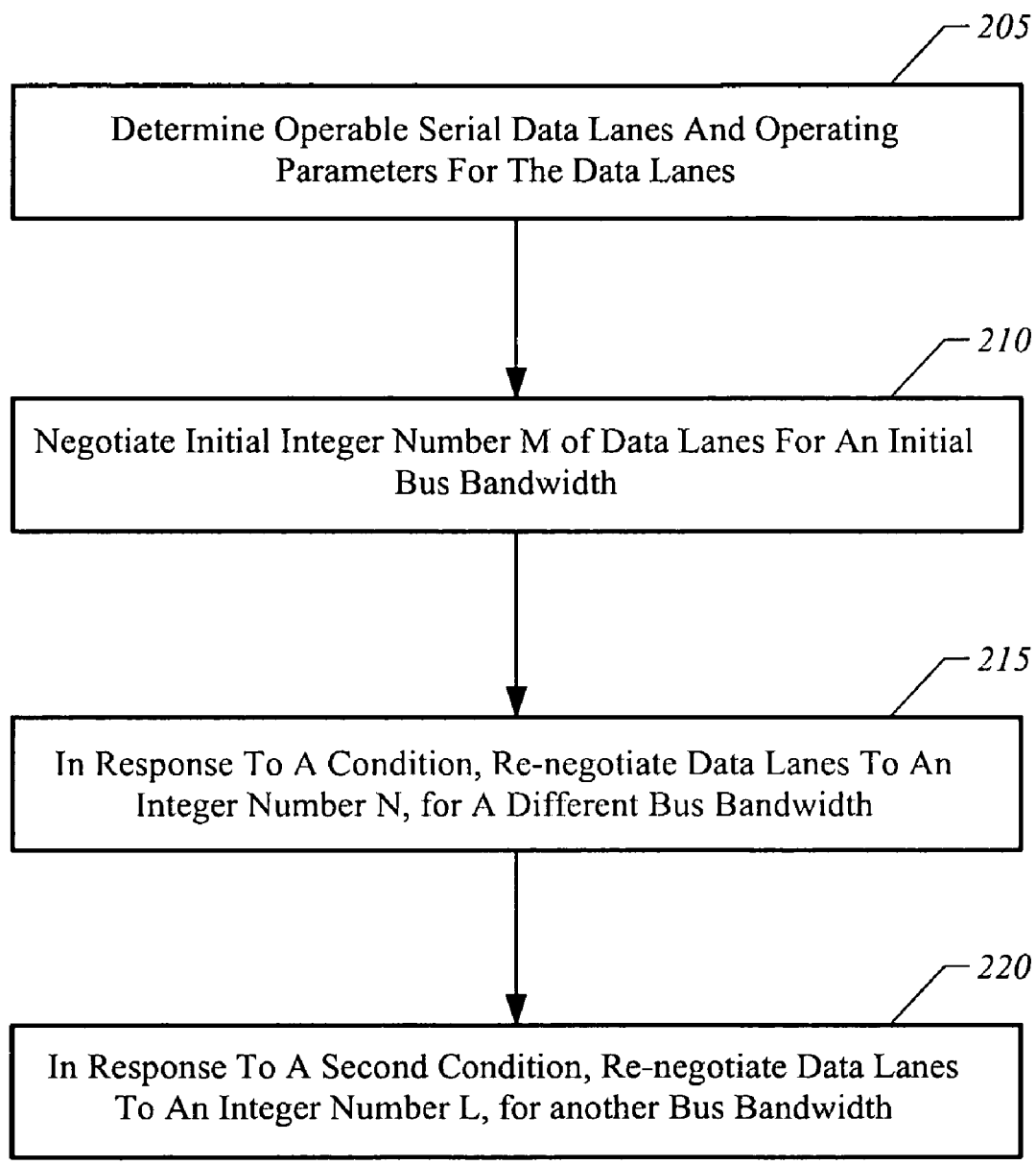
FIG. 2 is a flowchart illustrating a method for negotiating bus bandwidth in accordance with one embodiment of the present invention.

Referring to the flowchart of FIG. 2, in one embodiment the bus determines 205 operable serial data lanes and operating parameters for the data lanes. As an illustrative example, there may be a maximum integer number, K, of operable data lanes that are supported by both interfaces, where K is 2. At a certain point of time, the interfaces of the bus negotiate 210 an integer number, M (M K), of active data lanes for an operational linkwidth. The bus may then enter a normal operational state in which data may be exchanged across the bus using the M active data lanes. In response to a condition for which the bus bandwidth requirements change, the interfaces of the bus re-negotiate 215 the number of active data lanes used in the link to a different integer number, N, corresponding to a different link width (i.e., M N, N K). The bus may then enter a normal operational state in which data is exchanged across the bus using the N data lanes. The process may continue based on other conditions. For example, another condition may occur which triggers the interfaces of the bus to renegotiate 220 the number of active data lanes used in the link to a third integer number, L, of active data lanes.

For example, a computing system may have bus bandwidth requirements corresponding to two or more levels of bus traffic, such as low and high bandwidth requirements or high, medium, and low bandwidth requirements. The bandwidth requirements may be associated with the type of software being executed by system 100. For example, word processing applications commonly have comparatively low bandwidth requirements in comparison to high-performance three-dimensional graphics applications. The bandwidth requirements of a software application may be detected from an attribute of the software. For example, some software applications, such as high-performance graphics applications, include function or resource calls that are indicative of their bandwidth requirements. Additionally, some system states may be detected by hardware, such as idle states or busy "wait states" in which a portion of system 100 may be internally processing information such that the system generates comparatively little traffic for bus 115. Moreover, in one embodiment, power management software may reduce bus bandwidth in a low power mode and increase bus bandwidth for an active mode.

In one embodiment, adaptive link width controller 150 includes link width control registers 160 that may be written into by hardware or software detection elements (not shown in FIG. 1) when an event is detected corresponding to a change in the bandwidth requirements for bus 115.

In one embodiment, the bus interfaces 130 and 135 form the link between the components through a training sequence in which training sequence signals are sent back and forth between the bus interfaces to communicate information and coordinate the states of each interface. Among other tasks, the training sequence messages permit one of the interfaces to trigger the other interface to enter a different state of its link state machine 140. Thus, in a first training sequence a first link width may be negotiated whereas a second link width may be subsequently negotiated using a second training sequence.

Figure 3:
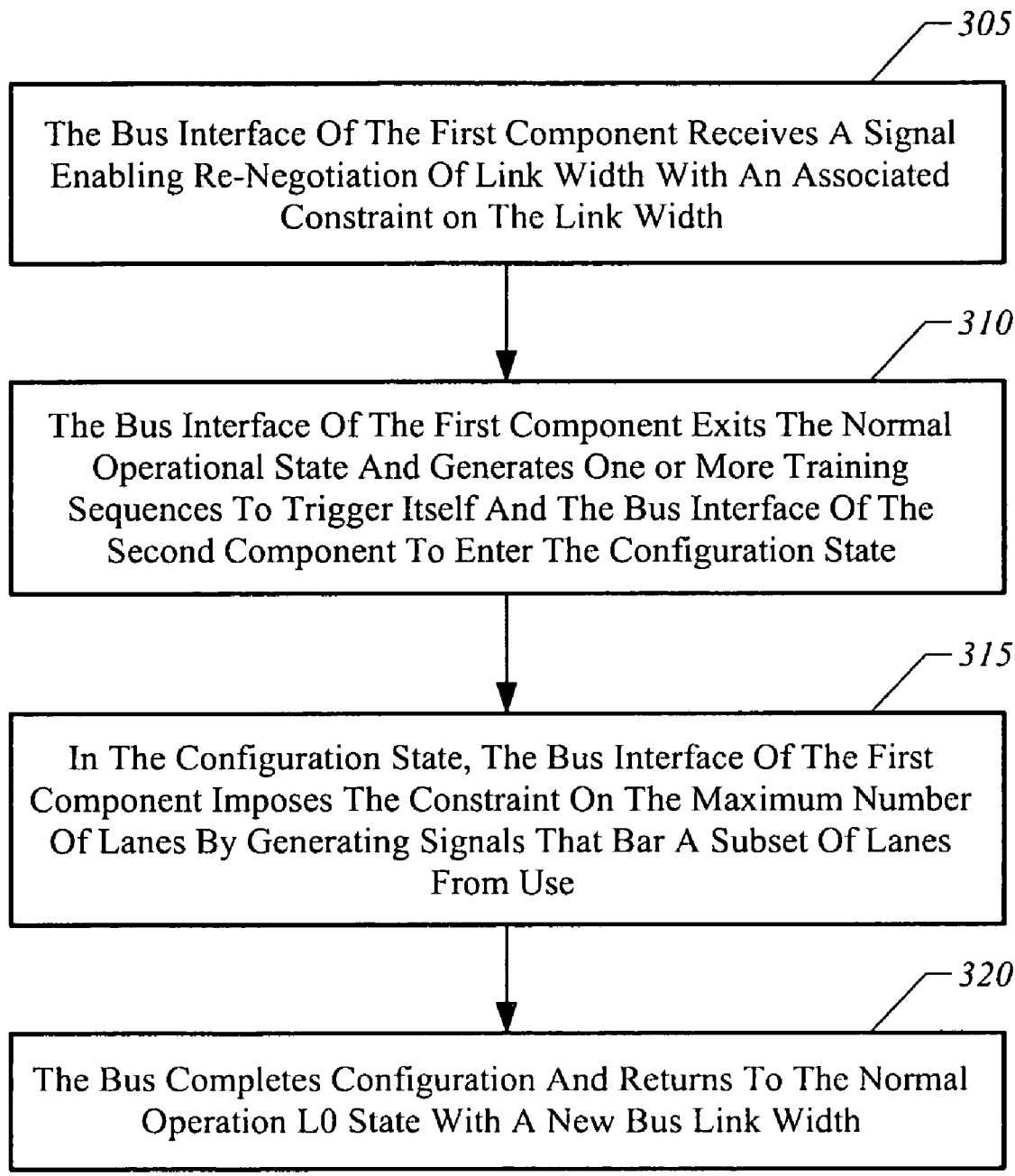
FIG. 3 is a flowchart illustrating a method for negotiating bus bandwidth in accordance with one embodiment of the present invention.

Referring to the flowchart of FIG. 3, in one embodiment a first bus interface receives 305 a signal enabling re-negotiation of link width and which places a constraint on the bus link width. The first bus interfaces exits the normal operational state (sometimes known as "L0") and generates 310 one or more training sequences selected to trigger itself and the second bus interface to enter a configuration state. In the configuration state, the first bus interface imposes 315 a constraint on the number of operable data lanes that may be used. This may, for example, include creating training sequence messages that indicate to the other interface that certain lanes are not to be used, even though they are operable lanes (e.g., by sending a signal indicating that one or more lanes are disabled). The bus completes configuration 320 and returns to the normal operational state with the modified bus link width.

It is preferable to have one interface control the renegotiation process, i.e., both trigger the initial re-negotiation and also place a constraint on the link width during the negotiation. However, it will be understood that in alternative embodiments one interface may trigger the re-negotiation process while the other interface places the constraint on the link width during the re-negotiation.

Each re-negotiation process is significantly faster than the initial negotiation because one or more steps used in the initial link initialization process may be omitted in the renegotiation process. For example, a conventional bus reset or power up operation includes resetting the state of registers, detecting operable data lanes and, setting common communication parameters of the lanes. This corresponds to Reset, Detect, and Polling states used in an initialization process. The Reset, Detect, and Polling states require a substantial amount of time in comparison to the configuration state used to negotiate link width. Consequently, in the present invention each re-negotiation can be fast in comparison to a reset process.

Figure 4:
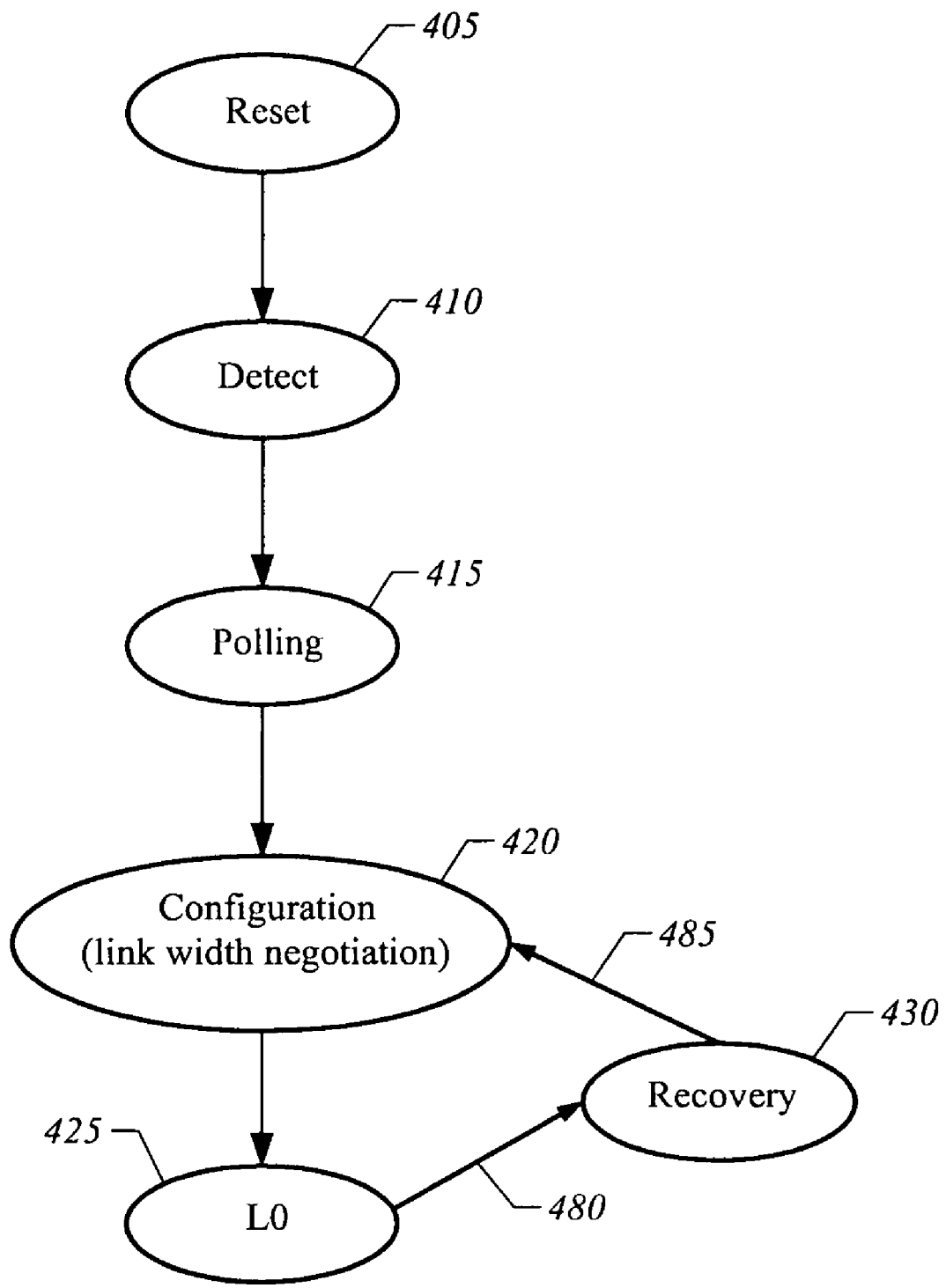
FIG. 4 is a state diagram illustrating a method for triggering re-negotiation of bus bandwidth in accordance with one embodiment of the present invention.

FIG. 4 is a state diagram for link state machine 140 in one embodiment of the present invention. Conventionally, the link is initialized by triggering a reset state 405. A detect state 410 is entered to detect operable lanes. Subsequent to the Detect state, a Polling state 415 is entered to poll the lanes and arrive at common operating parameters such that the lanes may communicate training sequences. Subsequent to the polling state, a configuration state 420 is entered to configure the link. The configuration state 420 includes link width negotiation. After the link is configured, the bus enters an operational state 425 in which the bus is capable of transmitting data. In some embodiments, additional low power operational modes (e.g., L1 and L2 sleep states for the entire link width) may be entered from operational state 425. An example of an implementation of low power operational modes is described in the co-pending U.S. patent application Ser. No. 10/431,989 entitled, "Method and Apparatus for Power Management of Electrical Components," assigned to the same assignee as the present application, the contents of which are hereby incorporated by reference.

Referring to arrows 480 and 485, the renegotiation process uses one or more additional states of the link state machine to access the configuration state 420 from operational state 425. A recovery state 430 is sometimes included in a link state machine to permit a bus to recover an attribute of the bus. In one embodiment, the renegotiation process begins in the normal operational state 425. One of the interfaces generates a training sequence that causes both interfaces to enter recovery state 430. From recovery state 430 the interfaces then enter configuration state 420 and re-negotiate link width using any constraints on link width imposed by the initiating user interface.

Figure 5:
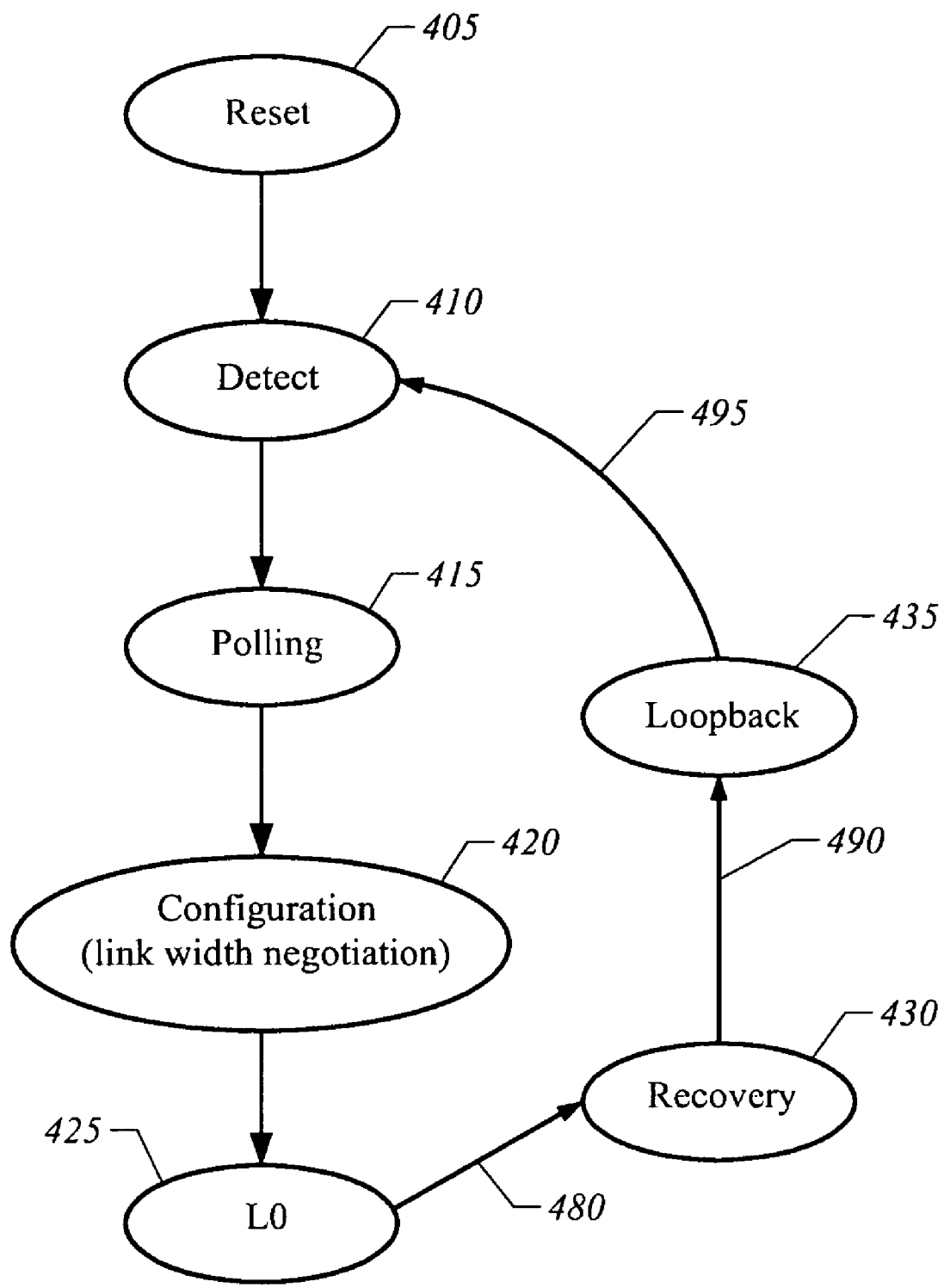
FIG. 5 is a state diagram illustrating a method of triggering re-negotiation of bus bandwidth in accordance with one embodiment of the present invention.

FIG. 5 illustrates a state machine diagram for an alternate embodiment. Referring to arrows 480, 490, and 495, in one embodiment the initiating interface generates training messages that cause a transition to the Recovery state 430. From the recovery state 430 the state machines enter a Loopback state 435. Loopback states are sometimes included in bus interfaces to perform diagnostics of individual components. In this embodiment of the present invention, the Detect state 410 is entered from the Loopback state 435. Thus, the Reset state 405 is avoided. Moreover, as described below in more detail, in some embodiments, the interactions of the state machines may be adapted to eliminate some of the sub-states of the detect state.

The apparatus, system, and method of the present invention may be adapted for use in a variety of bus types and bus protocols. In one embodiment, bus 115 is compliant with the Peripheral Component Interconnect (PCI) Express™ standard and a PCI express implementation will now be described. PCI Express™ is a standard developed by the Peripheral Component Interconnect-Special Interest Group (PCI-SIG) industry organization. The protocols of the PCI Express™ specification are described in the "PCI Express™ Base Specification," version 1(a), available from the PCI-SIG organization via the World Wide Web at the URL address: www.pcisig.com, the contents of which are hereby incorporated by reference.

In the PCI Express™ specification each point-to-point link between components may have 1, 2, 4, 8, 12, 16, or 32 dual simplex 2.5 Gbps lanes. PCI Express™ calls for 8 bit/10 bit data encoding to create a 2 differential pair, 2.5 Gbps (2.0 Gbps effective rate) dual simplex data stream with an embedded clock. In PCI Express™, a "symbol" is the 10 bit quantity produced as a result of 8 b/10 b encoding. The PCI Express™ specification calls for the link width to be negotiated to the maximum link width supported by both sides of the bus.

In a PCI Express™ implementation, link state machine 140 executes the states of the link training and status state machine (LTSSM) of the PCI Express™ specification. The PCI Express™ specification specifies mandatory LTSSM states and training set protocols. However, the PCI Express™ specification also permits individual developers to implement optional modifications as long as they are compatible with mandatory states and mandatory protocols. In the PCI Express™ protocol, training sequences are commonly denoted as TS1 or TS2 training sets.

In a PCI Express™ implementation the term "downstream" refers to a relative position that is farther away from a root complex and a downstream request is one in which information is flowing away from root complex (e.g., towards an endpoint device). Conversely, in a PCI Express™ implementation the term "upstream" refers to a relative position that is closer to the root complex and an upstream request is one in which information is flowing towards the root complex (e.g., from an endpoint device).

Referring back to FIG. 1, in one embodiment of a PCI Express™ implementation the signal that triggers a link width renegotiation may be received by a re-negotiation control register(s) within the link width control registers 160. For example, a signal from hardware or software indicative of a change in bus bandwidth requirements may be used to generate an enable signal and maximum link width written into re-negotiation control registers (RNCTRL). The maximum link width estimate should be compliant with a supported integer number of link widths. In one implementation, re-negotiation control register includes an enable bit, RNCTRL.Enable to enable re-negotiation and a maximum width bus field RNCTRL.Maxwidth to indicate the maximum number of lanes required.

In PCI Express™, training sequences are in the form of ordered sets TS1 and TS2 for initializing bit alignment, symbol alignment, and to negotiate physical layer parameters for operation, such as the link identification number and the lane ordering within the link. Control bits are included in TS1 and TS2 to perform specific functions. The TS1 and TS2 training sequences are used to discover and determine link width, link data rate, lane reversal, and polarity inversion. Training also includes link data rate negotiation, bit lock per lane, lane polarity, symbol lock per lane, lane ordering within a link, link width negotiation, and lane-to-lane deskew. In general, the PCI Express™ protocol uses TS1 training ordered-sets to provide proposals or counter-proposals of certain physical layer operational parameters and uses TS2 training ordered-sets to accept the proposals and confirm the parameters.

PCI Express™ also includes special symbols that are distinct from data symbols. These include special symbols used for link management. The symbol "PAD" is used in framing and link width and lane ordering negotiations.

Referring again to FIGS. 4 and 5, the LTSSM of each interface of a PCI Express™ implementation includes a Reset state 405, Detect state 410, Polling state 415, Configuration state 420, Normal Operational state 425, Recovery state 430, and Loopback state 435. Details of these states specific to practicing a PCI Express™ embodiment will now be described.

Figure 6:
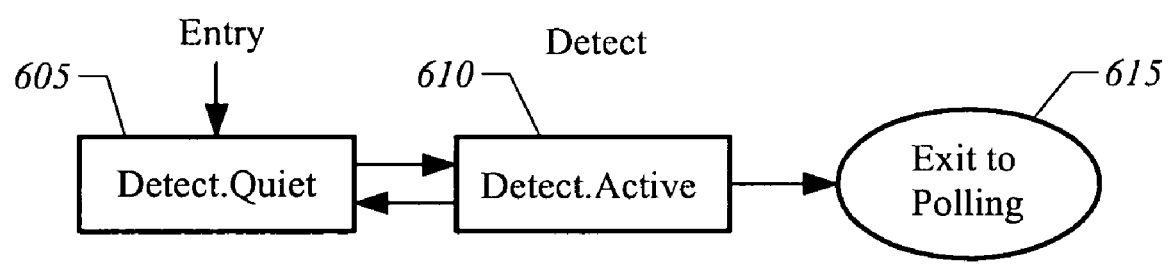
FIG. 6 is a sub-state diagram of a detect state in accordance with one embodiment of the present invention.

FIG. 6 is a block diagram illustrating a detect sub-state machine for implementing a detect state of a PCI Express™ LTSSM. In a detect state, the transmitter performs a receiver detection sequence on unconfigured lanes that can form one or more links. A Detect.Quiet state 605 is entered if a receiver is not detected on any lanes. If a receiver is detected on all active lanes, the Detect.Active state 610 is entered. If the Detect.Active state 610 succeeds in detecting receivers on all active lanes then the detect state exits to polling 615. A re-association process is initiated in the LTSSM for unconfigured lanes that did not detect a receiver. The PCI Express™ specification defines a protocol of training sets for each detect sub-state.

Figure 7:
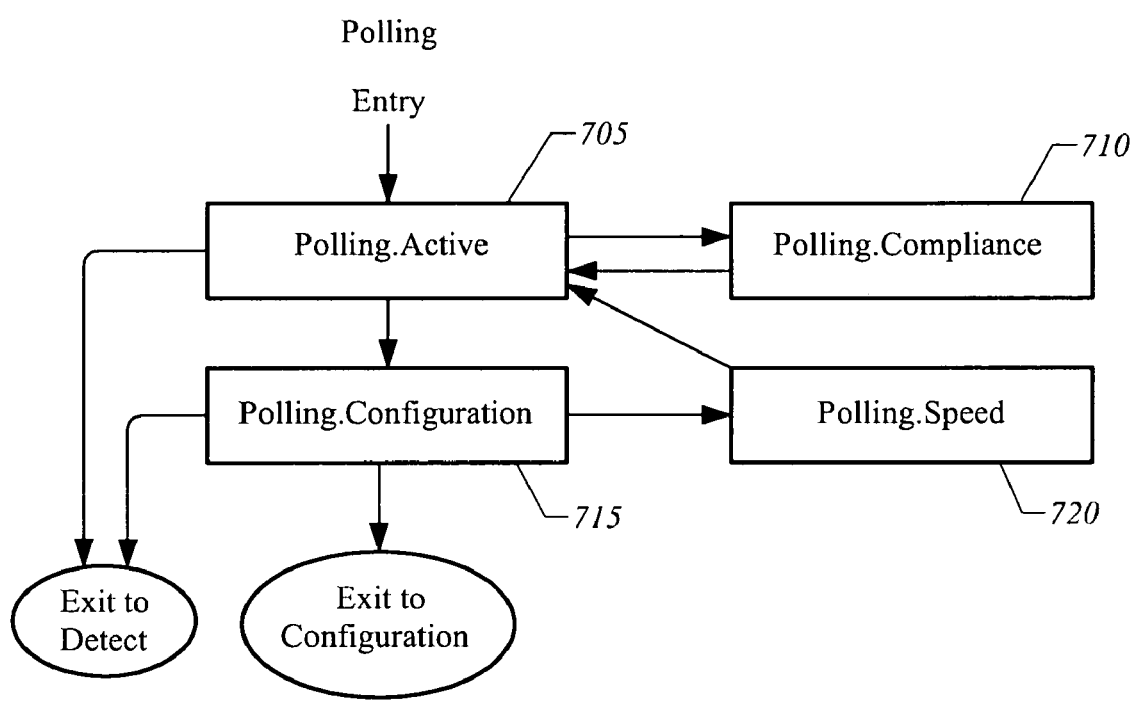
FIG. 7 is a sub-state diagram of a polling state in accordance with one embodiment of the present invention.

FIG. 7 is a block diagram illustrating a polling sub-state machine for implementing a polling state of a PCI Express™ LTSSM. In the polling state training ordered sets are sent and received. In the polling state bit lock is established, symbol lock is established, lane polarity is established, and lane data rate is established. The polling sub-states correspond to a Polling.Active state 705 that sends out TS1 ordered sets to indicate that polling is active and to establish bit and symbol lock, a Polling.Compliance state 710 for use with test equipment to assess if the bus is compliant with voltage and timing specifications, a Polling.Configuration state 715 sending out TS2 training ordered sets to confirm bit lock, symbol lock, and data rate, and to invert the polarity, if necessary, and a Polling.Speed state 720 to change the data rate to the highest data rate supported on both sides of the bus. The PCI Express™ specification defines a protocol of training sets for each polling sub-state.

Figure 8:
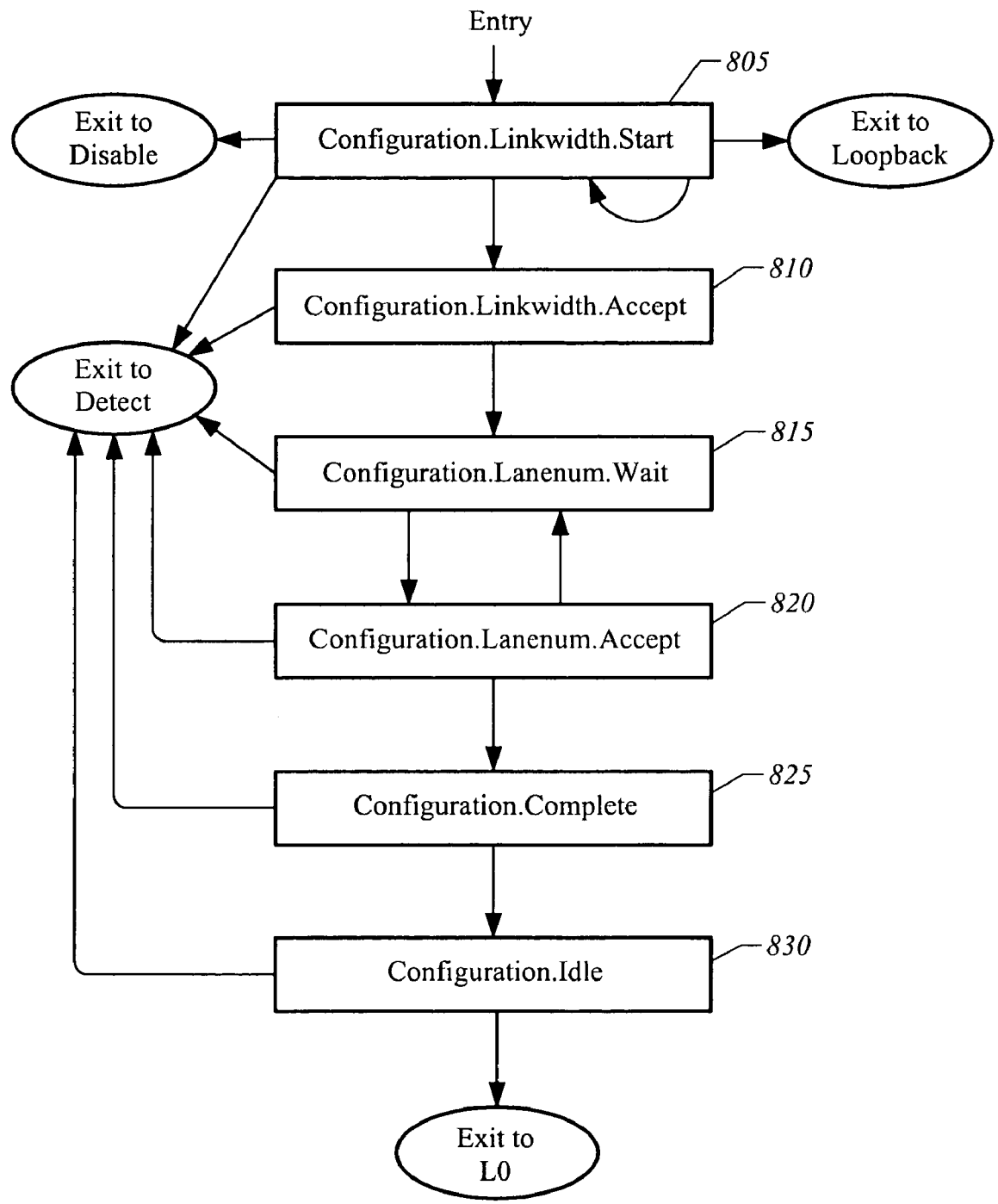
FIG. 8 is a sub-state diagram of a configuration state in accordance with one embodiment of the present invention.

FIG. 8 is a block diagram illustrating a configuration sub-state machine for implementing a configuration state of a PCI Express™ implementation. In the configuration state the lanes are configured into a link through a link width and lane ordering negotiation sequence. Referring to FIG. 8, the PCI Express™ specification includes the configuration sub-states of Configuration.Linkwidth.start 805 to initiate a link width negotiation by proposing a link identification number on the desired active lanes of the link, Configuration.Linkwidth.Accept 810 to accept the link identification number and to counter-propose the number of desired active lanes. Configuration.Lanenum.Wait 815 for proposing and counter-proposing the desired lane ordering, Configuration.Lanenum.Accept 820 for accepting lane ordering assignments, Configuration.Complete 825 to confirm completion of configuration, and Configuration.Idle 830 to place the link in a logically idle condition prior to the normal operational state. The PCI Express™ specification defines a protocol of training sets for each configuration sub-state.

Figure 9:
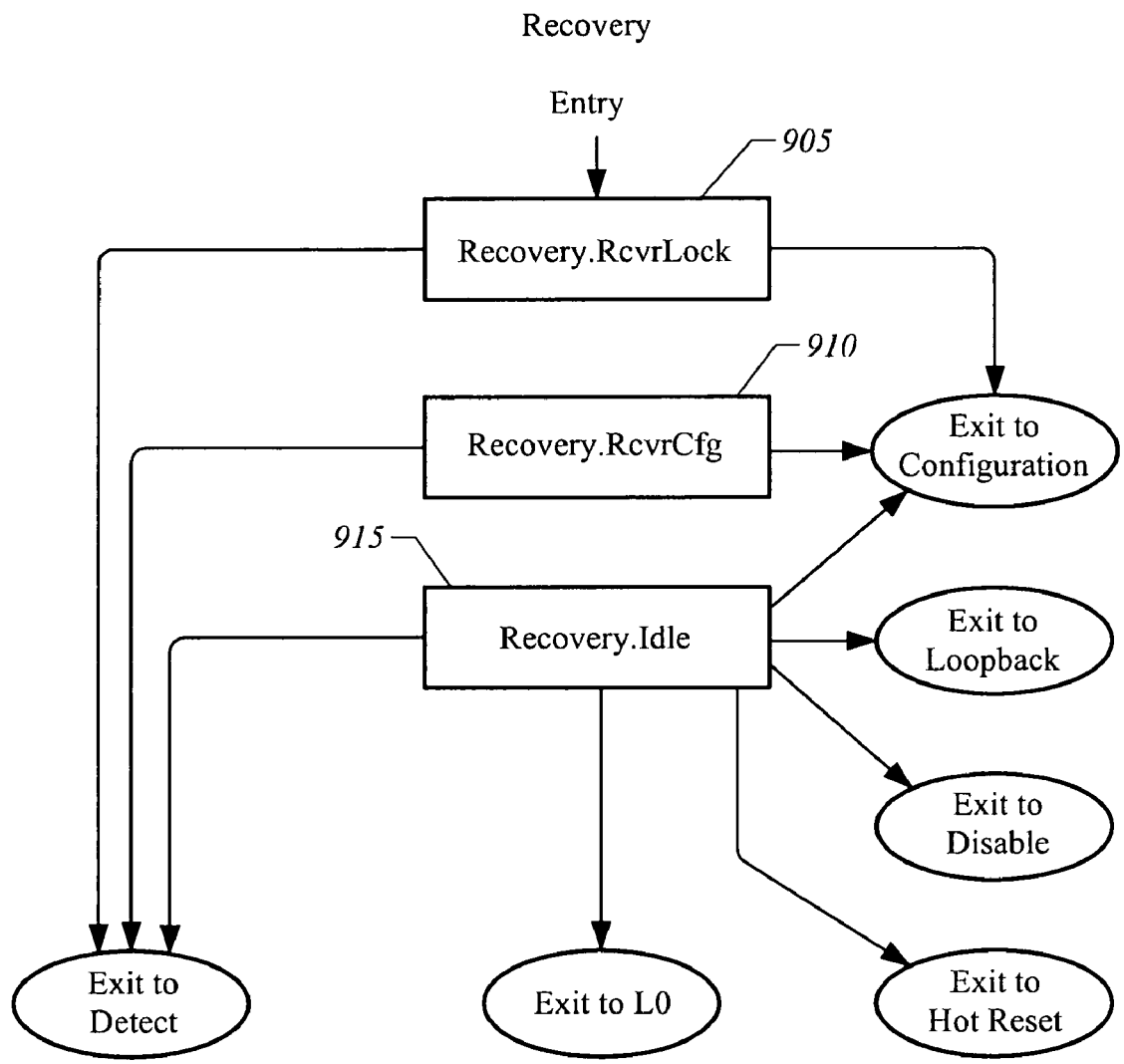
FIG. 9 is a sub-state diagram of a recovery state in accordance with one embodiment of the present invention.

FIG. 9 is a block diagram illustrating a sub-state machine for implementing a recovery state of a PCI Express™ LTSSM. The recovery state allows a configured link to re-establish bit lock, symbol lock, and lane-to-lane de-skew. In the recovery state the transmitter and receivers are sending and receiving data using the configured link and lane number as well as the previously negotiated data rate. The recovery sub-state machine includes a Recovery.Rcvrlock state 905 that sends ordered training sets to re-establish bit and symbol lock, a Recovery.RcvrCfg state 910 to re-establish lane-to-lane deskew and re-confirm the lane ordering assignment, and a Recovery.Idle state 915 that permits access to other states, based upon directions or other conditions. The PCI Express™ specification defines a protocol of training sets for each recovery sub-state.

Figure 10:
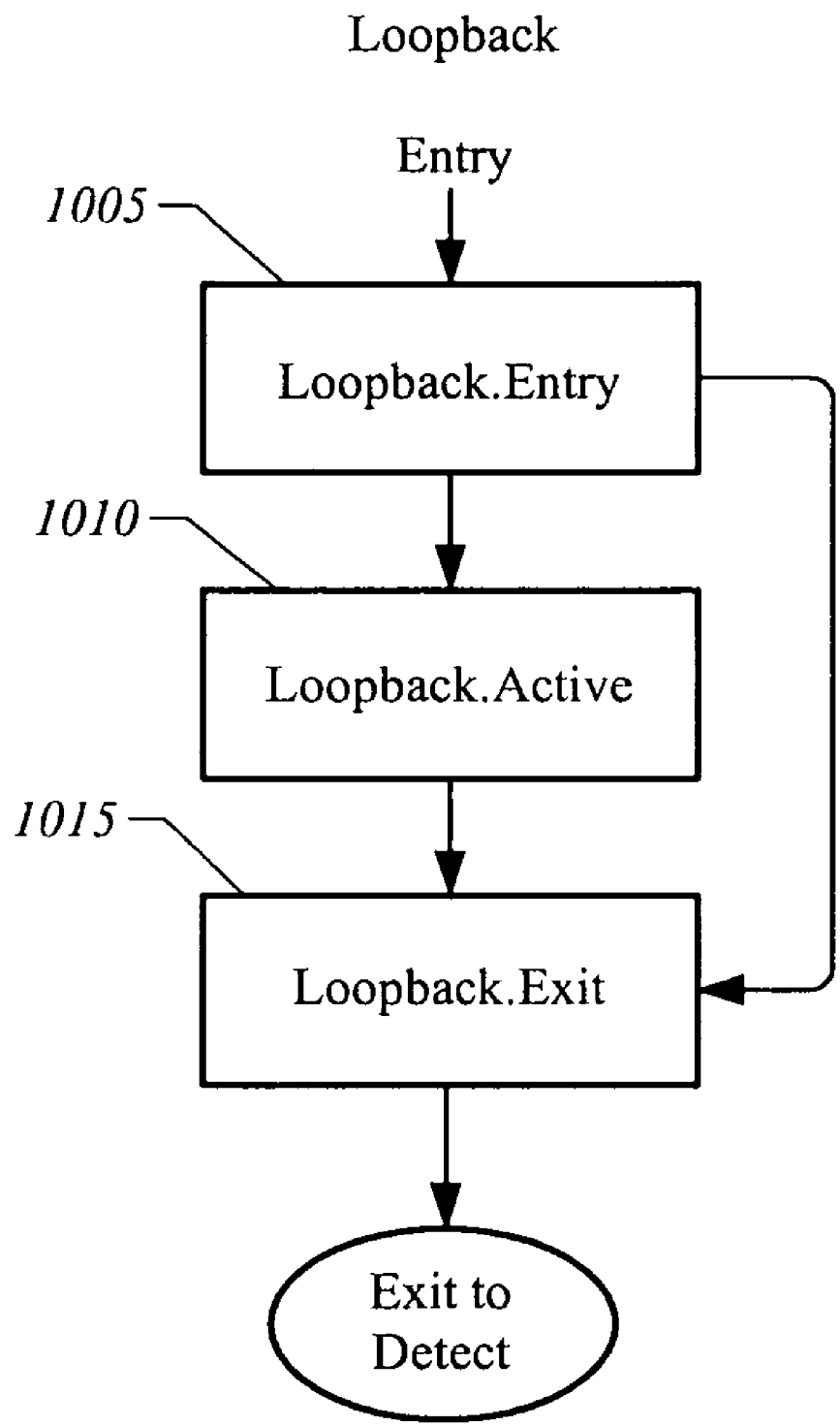
FIG. 10 is sub-state diagram of a loopback state in accordance with one embodiment of the present invention.

FIG. 10 is a block diagram illustrating the sub-states of loopback specified in PCI Express™ for the LTSSM. Loopback state 450 is conventionally included to allow for component testing and fault isolation. During loopback data that is sent out is looped back to test data paths of the bus. These include a Loopback.Entry state 1005 to enter loopback, a Loopback.Active state 1010 for an active loopback mode, and a Loopback.Exit state 1015 for a condition exiting loopback. The PCI Express™ specification defines a protocol of training sets for each loopback sub-state.

In a PCI Express™ implementation, the two LTSSMs of the bus interfaces interact through TS1 and TS2 ordered training sets that are exchanged between the LTSSMs. The interactions between the LTSSMs cause them to move through a sequence of sub-states. In the present invention, at least one of the LTSSMs is adapted to create training sequences that initiate the link width renegotiation process and that places a constraint on the link width negotiation. As described below in more detail, in one embodiment the PAD symbol is inserted in training sequences to disable selected lanes.

Figure 11:
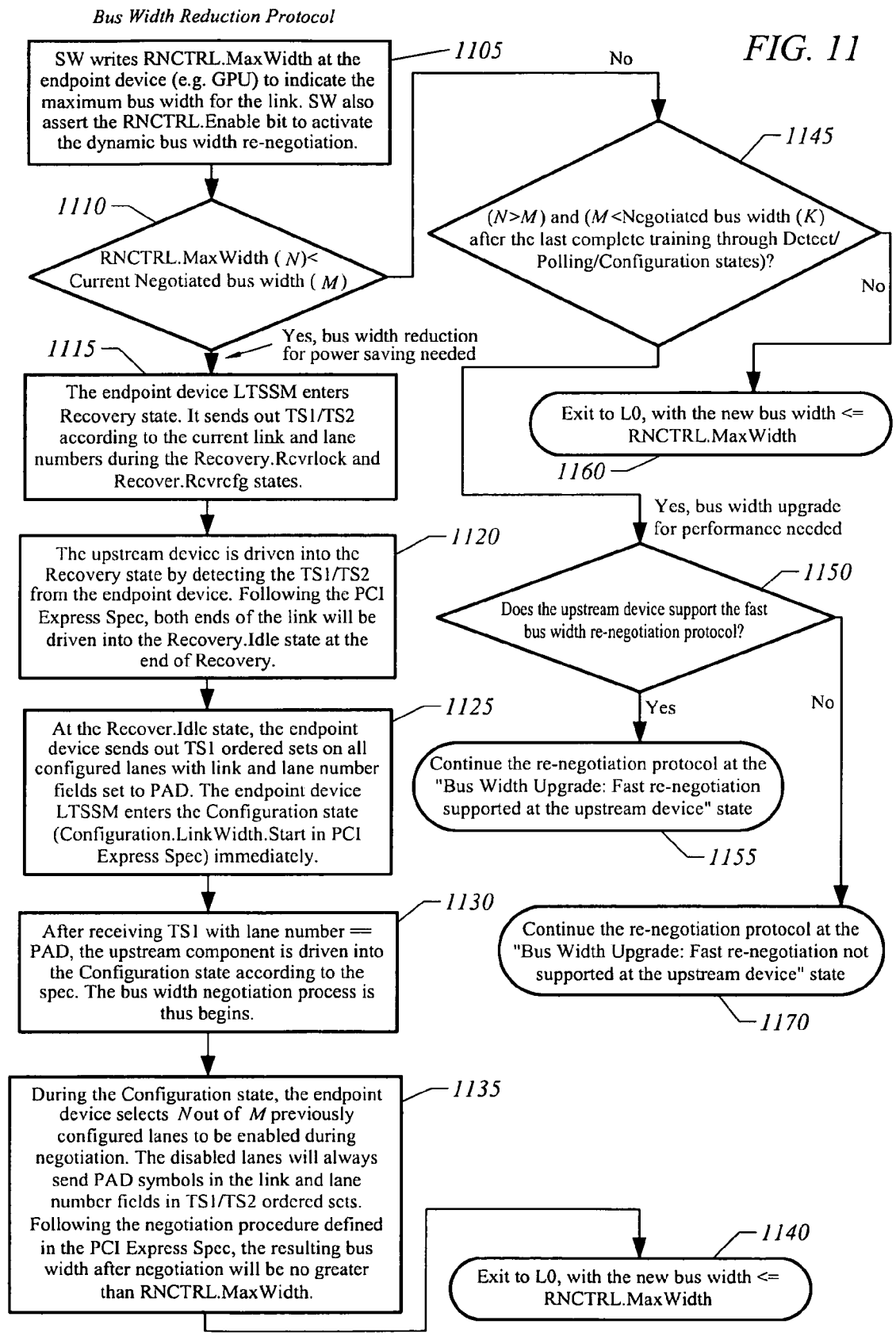
FIG. 11 is a flow chart illustrating a method of bus link width reduction in accordance with one embodiment of the present invention.
Figure 12:
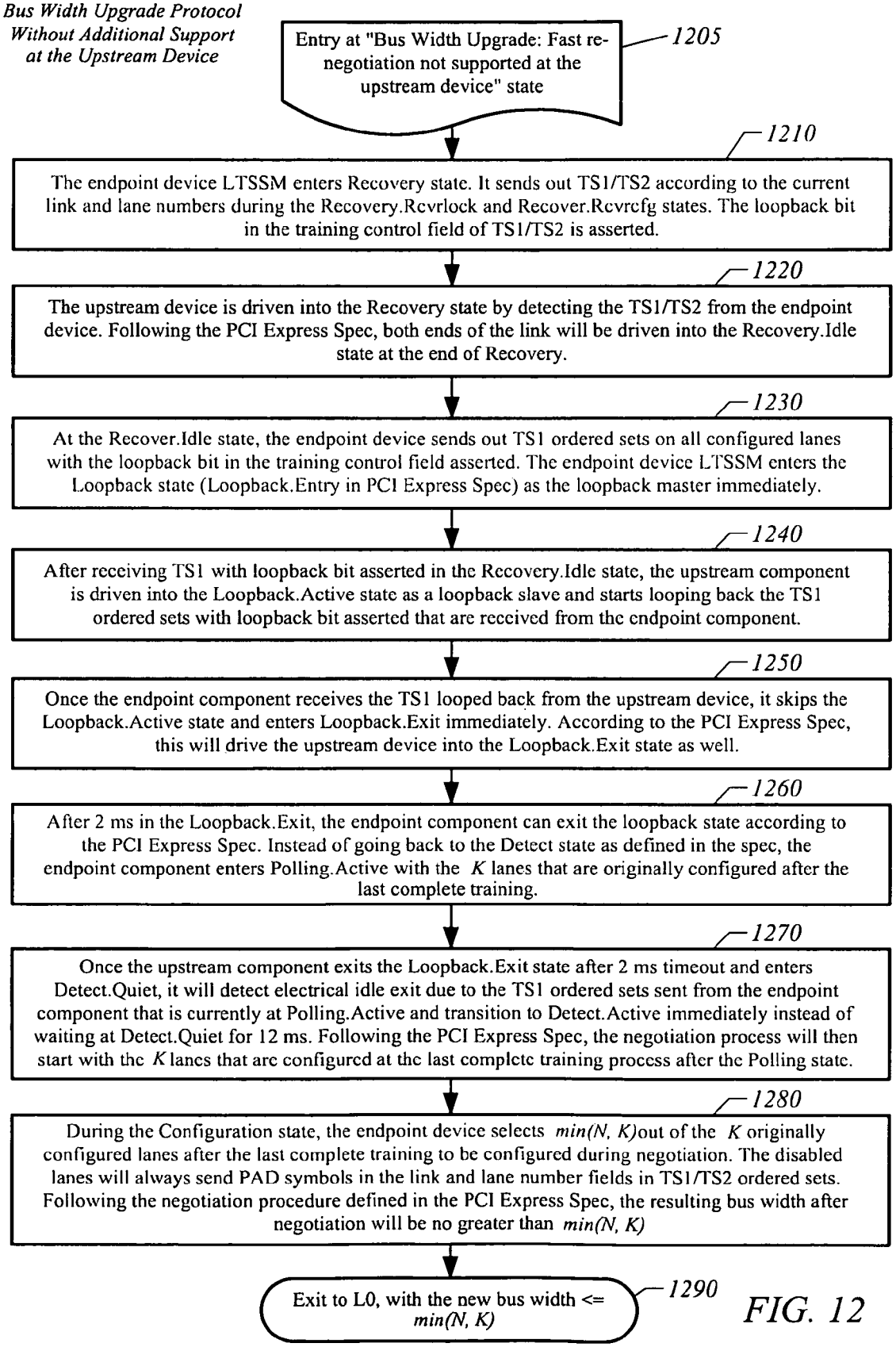
FIG. 12 is a flow chart illustrating a method of bus link width increase in accordance with one embodiment of the present invention.
Figure 13:
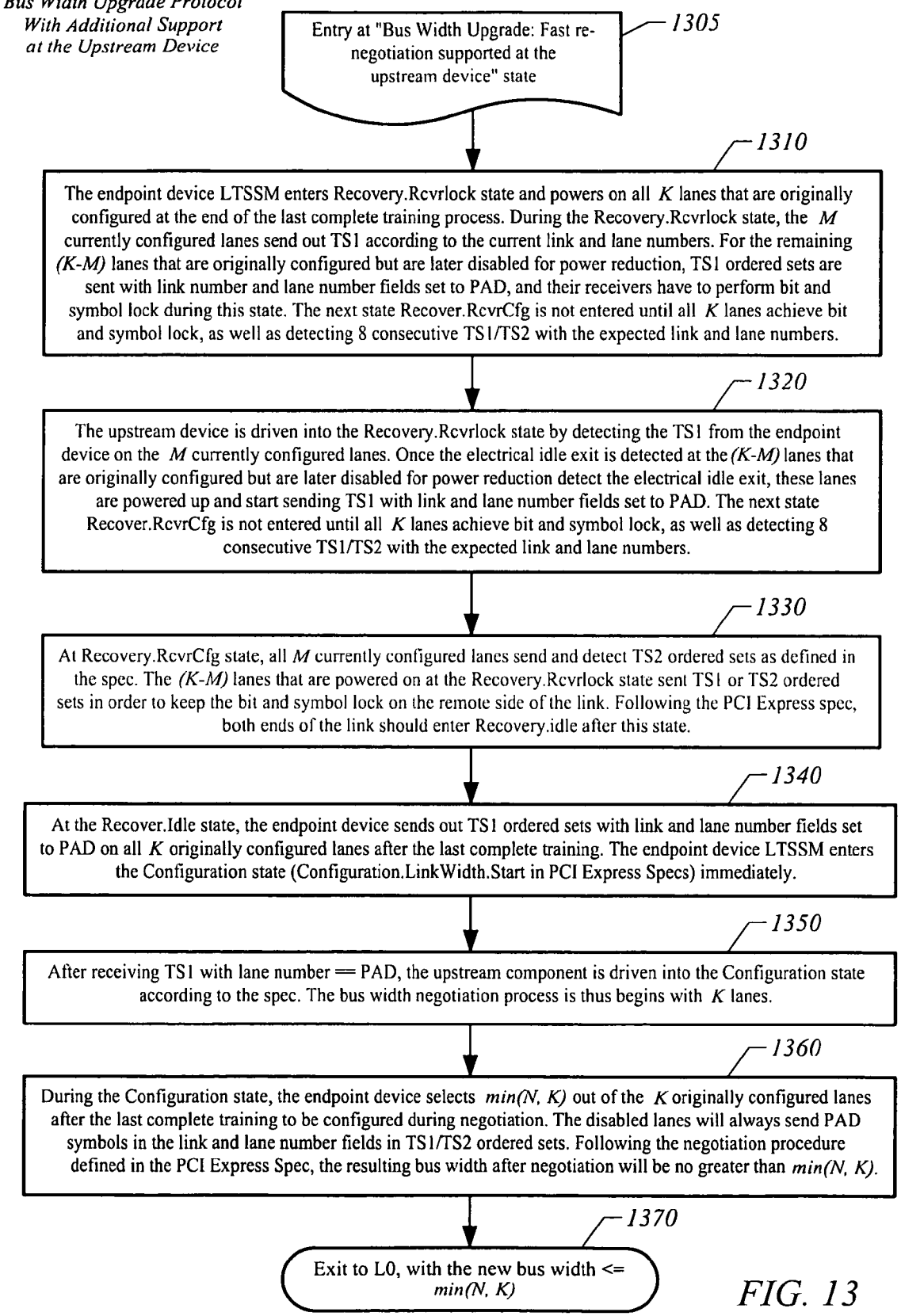
FIG. 13 is a flow chart illustrating a method of bus link width increase in accordance with one embodiment of the present invention.

FIG. 11 is a flow chart illustrating a PCI Express™ implementation in which an end point device initiates the renegotiation process by triggering entry into the recovery state to enter the configuration state to renegotiate link widths. Steps 1105-1140 illustrate a reduction of link width whereas steps 1145-1170 outline the steps for an increase in link width (which are illustrated in FIGS. 12-13 in more detail).

Referring to FIG. 11, in one embodiment a hardware or software entity activates re-negotiation in the endpoint device. This includes asserting 1105 the RNCTRL.Enable bit and writing the RNCTRL.Maxwidth field of the renegotiation control register(s).

The interface compares 1110 RNCTRL.Maxwidth to the value of the LinkStat.Linkwidth, the currently negotiated bus width recorded in a link status register. If LinkState.Linkwidth, M, is greater than RNCTRL.Maxwidth, N, (e.g., N<M), it corresponds to a determination that the bus width can be reduced to save power. The endpoint device LTSSM then enters 1115 the recovery state. It sends out training sets TS1 and TS2 according to the current link and lane numbers as specified by the PCI Express™ for the Recovery.Rcvrlock and Recovery.Rcvrcfg states of the recovery sub-state machine.

As a result the upstream device (e.g., the root complex) is driven 1120 into the recovery state upon detecting the TS1/TS2 training sets sent by the downstream device. The link number and lane number fields in the TS1/TS2 remain the same as for previously negotiated values during Recovery.Rcvrlock and Recovery.Rcvrcfg. Since the link number and lane number fields are unchanged, the Recover.Rcvr-Lock and Recovery.RcvrCfg sub-states may be completed comparatively quickly, e.g., around 32 TS1/TS2 periods, or 512 Symbol times. This results in both ends of the link being driven into the Recovery.Idle sub-state at the end of recovery.

At the recovery.idle sub-state, instead of placing the link into a locally idle state by sending null symbols, the endpoint device sends out 1125 TS1 ordered sets on all configured lanes with the link number the same as the original value. The lane number field of the TS1 ordered sets is assigned the value of "PAD". The endpoint device enters the configuration sub-state Configuration.Linkwidth.Start.

The upstream component is driven 1130 into the configuration state by receiving TS1 ordered sets with lane number being "PAD". In one embodiment, two consecutive TS1 ordered sets with lane number field being "PAD" on the Recovery.Idle state causes the upstream component to enter the Configuration.Linkwidth. Start sub-state.

With both components in the Configuration.Linkwidt-.Start sub-state, link width re-negotiation begins. During re-negotiation, the endpoint device uses the RNCTRL-.MAXWIDTH setting to disable 1135 a selected number of the originally enabled lanes such that the total number of enabled lanes at the endpoint component is no greater than RNCTRL.Maxwidth. As a result, the normal operation state is entered 1140 with the new bus width of RNCTRL.Maxwidth.

Referring to comparison step 1110, it is also necessary to negotiate increases in link width, which corresponds to RNCTRL.Maxwidth being greater than the current negotiated link width (N>M). The route depends whether the current negotiated link width is less than the maximum link width (K) (e.g., the maximum that would be negotiated without a RNCTR.Maxwidth constraint, which is obtained during the initial power-up negotiation process) and upon whether the upstream device is adapted to support renegotiation by entering the configuration state directly from the recovery state.

The condition N>M and M<K is evaluated 1145 to see if further increase in link width is possible. If no further increase in link width is permitted, a return 1160 is made to the operational state with the bandwidth unchanged (since it is already at a maximum). If the link width can be increased, a determination is made whether the upstream device supports 1150 a fast bus width re-negotiation protocol that enters 1155 the configuration state directly from the recovery state. If the upstream device does not support a fast bus width renegotiation protocol, a protocol is used 1170 which enters the configuration state through the loopback state.

Negotiating an increase in link width depends upon whether the upstream device (e.g., the root complex) obeys the standard PCI Express™ protocol or has been modified to support a fast renegotiation. This is due, in part, to the nature of the specific mandatory protocols of the PCI Express™ specification. For the case that the upstream device does not support fast renegotiation, the entry to the configuration step may require entry via the loopback step, as illustrated in FIG. 5. However, if the upstream device supports fast negotiation, the entry to the configuration may be made directly from the configuration step, as illustrated in FIG. 4.

FIG. 12 illustrates an embodiment in which fast renegotiation of an increase in bus width is not supported by the upstream device. A determination that the upstream devices does not support fast renegotiation can be made 1205, for example, by examining a vendor ID field to determine the functionality of the upstream device. As previously described, the endpoint device LTSSM enters 1210 the recovery state and sends out TS1/TS2 training sets according to the current link and lane numbers during the Recovery.RcvrLock and Recovery.RcvrCfg sub-states. Additionally, the loopback bit in the training control field of the TS1/TS2 training sets is asserted.

In response to the TS1/TS2 ordered sets, the upstream device is driven 1220 into the Recovery state. Consequently, both ends of the link are driven into the Recovery.Idle sub-state of the recovery state after Recovery.RcvrLock and Recovery.RcvrCfg.

At the Recovery.Idle sub-state, the endpoint device sends out 1230 TS1 ordered sets on all configured lanes with the loopback bit in the training control field asserted. The endpoint device LTSSM enters the Loopback.Entry sub-state of the loopback state as the loopback master.

The upstream component is driven 1240 into the Loopback.Active sub-state as a loopback slave after receiving TS1 with loopback asserted while it is in the Recovery.Idle state. The upstream component then starts looping back the TS1 ordered sets with the loopback bit asserted that are received from the endpoint component.

In response to the endpoint component receiving the TS1 looped back from the upstream device, it skips the Loopback.Active state and enters 1250 Loopback.Exit immediately. This drives the upstream device into the Loopback-.Exit state as well.

The endpoint component can then exit 1260 the loopback state. In one embodiment, the endpoint component enters the Polling.Active sub-state with all K lanes that are maximally configured without a RNCTR.Maxwidth constraint. The (K−M) lanes, which are enabled at the initial power-up negotiation process but are disabled for power reduction, are re-activated here to start the link-width increase negotiation process.

The upstream component exits 1270 the Loopback.Exit sub-state and enters the Detect.Quiet sub-state. In response to the K active lanes in the endpoint component, the upstream component will be driven into the Polling state with K active lanes as well.

Note that by re-activating the disabled lanes in the endpoint component, the re-negotiation begins with the maximum number of active lanes negotiated during the initial power-up negotiation. For a maximum number of lanes, K, and a RNCTRL.Maxwidth value of N, the endpoint device selects the minimum of N and K as the new link width, and use the information to constrain the re-negotiation process. During configuration, lanes that are selected to be disabled send 1280 pad symbols in the link and lane numbers fields of TS1/TS2 ordered sets. In this way, the bus exits 1290 to the normal operating state at the end of configuration with a new link width no greater than RNCTRL.Maxwidth.

FIG. 13 is a flowchart illustrating a bus width upgrade protocol that is supported by the upstream device. A determination that the upstream device supports 1305 fast renegotiation may be made, for example, using a vendor ID field of a training set.

The endpoint device enters 1310 the Recovery.RcvrLock sub-state. The M currently configured lanes send out TS1 training sets according to the current link and lane numbers. The previously disabled (K–M) lanes among the K maximally negotiated lanes are re-activated. For the re-activated lanes, the PAD symbol is sent in the link number and lane number fields of TS1 training sets, and their receivers have to perform bit and symbol lock as well during the Recovery.RcvrCfg state. The next state, Recover.RcvrCfg, for the endpoint device is not reached until all of the K lanes achieve bit and symbol lock.

The upstream device is driven 1320 into the Recovery.RcvrLock state upon detecting TS1 ordered sets from the endpoint device on the M currently configured lanes. Once an electrical idle exit is detected on the formerly disabled (K–M) lanes, the lanes are re-activated and start sending TS1 ordered sets with link and lane number fields set to PAD. The next state Recover.RcvrCfg is not entered until all K lanes achieve bit and symbol lock.

At the Recovery.RcvrCfg sub-state, all of the M currently configured lanes send out 1330 and detect TS2 ordered sets. The (K–M) re-activated lanes also send TS1 or TS2 ordered sets in order to keep the bit and symbol lock on the other side of the link. Both ends of the link then enter the Recovery.Idle sub-state.

At the Recovery.Idle sub-state, the endpoint device sends out 1340 TS1 ordered sets with link and lane number fields set to PAD on all K enabled lanes (including M currently configured and (K–M) re-activated lanes). The endpoint device LTSSM enters the configuration sub-state Configuration.Linkwidth.Start.

After receiving a TS1 ordered set with the lane numbers set to PAD, the upstream component is driven 1350 into the Configuration state and begins the link width re-negotiation with K active lanes.

Note that by re-activating the disabled lanes in both components, the re-negotiation begins with the maximum number of active lanes negotiated during the initial power-up negotiation. For a maximum number of lanes, K, and a RNCTRL.Maxwidth value of N, the endpoint device selects the minimum of N and K as the new link width, and uses the information to constrain the re-negotiation process. During Configuration sub-states, lanes that are to be disabled send 1360 pad symbols in the link and lane numbers fields of TS1/TS2 ordered sets. In this way, the bus then exits 1370 to the normal operating state at the end of configuration with a new link width no greater than RNCTRL.Maxwidth.

One application of the present invention is in a computer system having a CPU, GPU, and software applications with different bus bandwidth needs. In particular, some high performance graphics applications (e.g., three-dimensional graphics applications) have extremely high bandwidth requirements in comparison to other applications, such as text processing or two-dimensional graphics. Additionally, a GPU executing a high performance graphics applications requires substantial computing power. In a graphics system the bus of the present invention preferably is part of a larger power saving architecture in which the GPU and the bus have power-saving modes that permit both GPU power and bus power to be decreased when high performance graphics applications are not in use.

Figure 14:
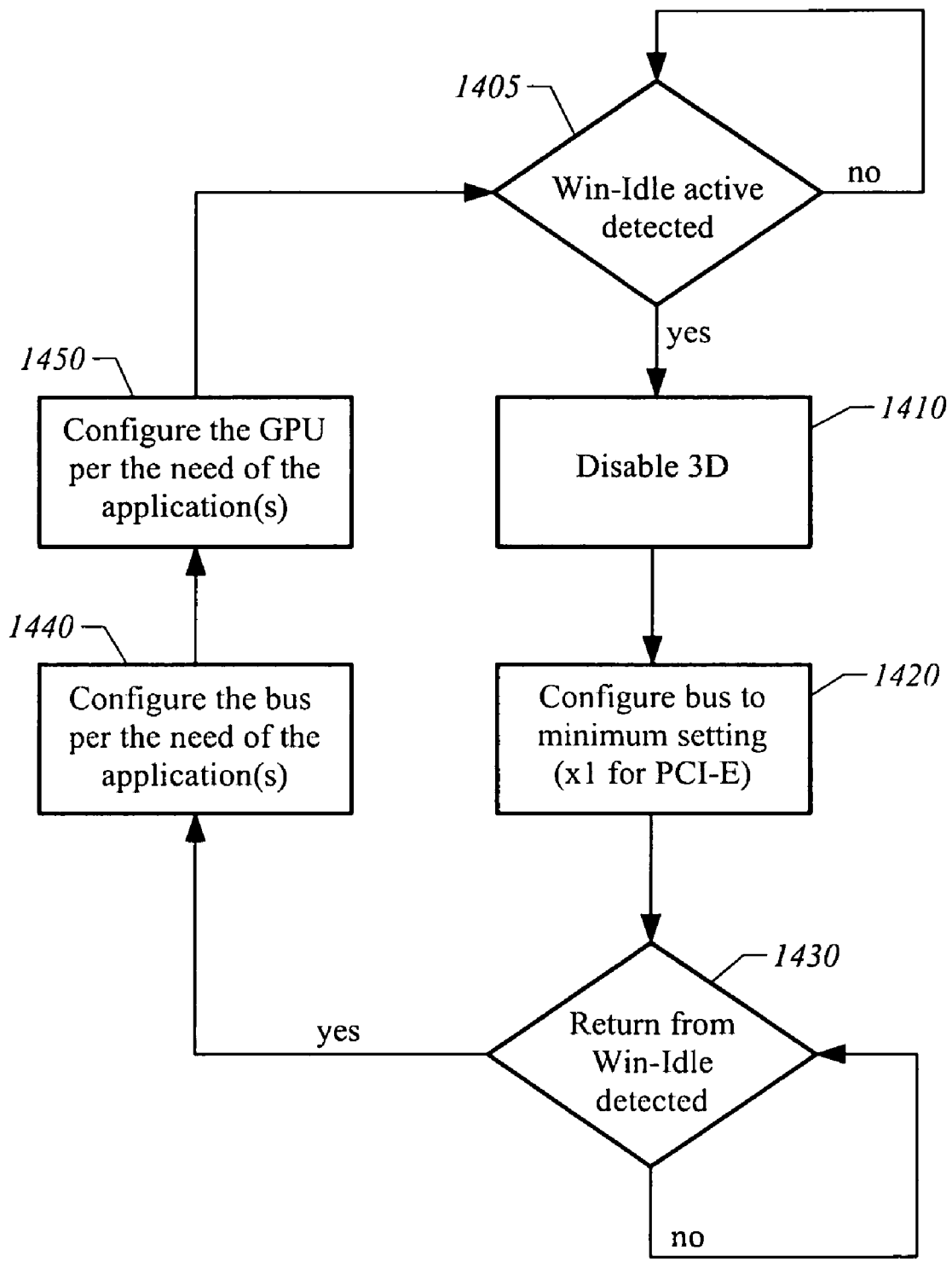
FIG. 14 is a flow chart illustrating a method of adapting bus bandwidth for a graphics system in which a software application may run software applications having different processing requirements and different bus bandwidth requirements in accordance with one embodiment of the present invention.

FIG. 14 is a flow chart of one method of saving power in a graphics system. Responsive to detecting an idle state for the system, 3-D graphics may be disabled 1410. This may include, for example, switching a GPU to a low-power consumption state. Correspondingly, the bus is configured to have a minimum link width 1420 (e.g., one lane). In response to detecting exit 1430 from an idle state, the bus is configured 1440 to have a link width appropriate for the application. The GPU is configured 1450 for the need of the application.

Some of the benefits of the present invention will now be discussed with regards to an exemplary implementation. In a high performance graphics system, a bus having 16 active lanes may be required. For the operational (L0) state, the power consumption may be 100 milliwatts per active lane per direction, or 200 milliwatts per lane. Thus, in a 16 lane configuration a PCI Express™ bus may consume 3.2 Watts of power. However, in the present invention, the link width may be negotiated to a low number for other applications, e.g., one lane for a text processing application. Negotiating a 1 lane configuration when high bus bandwidth is not required results in a savings of 3 Watts, or 94% of the bus power.

Additionally, the present invention permits the bus width to be negotiated in a comparatively short time. In a PCI Express implementation, completion of the detect and polling states takes at least 12 milliseconds. By comparison, the configuration state takes only a few microseconds to complete. Consequently, the present invention permits a comparatively fast renegotiation. In the context of a graphics system, the renegotiation process may be sufficiently rapid that it does not interfere with a user's experience.

Figure 15:
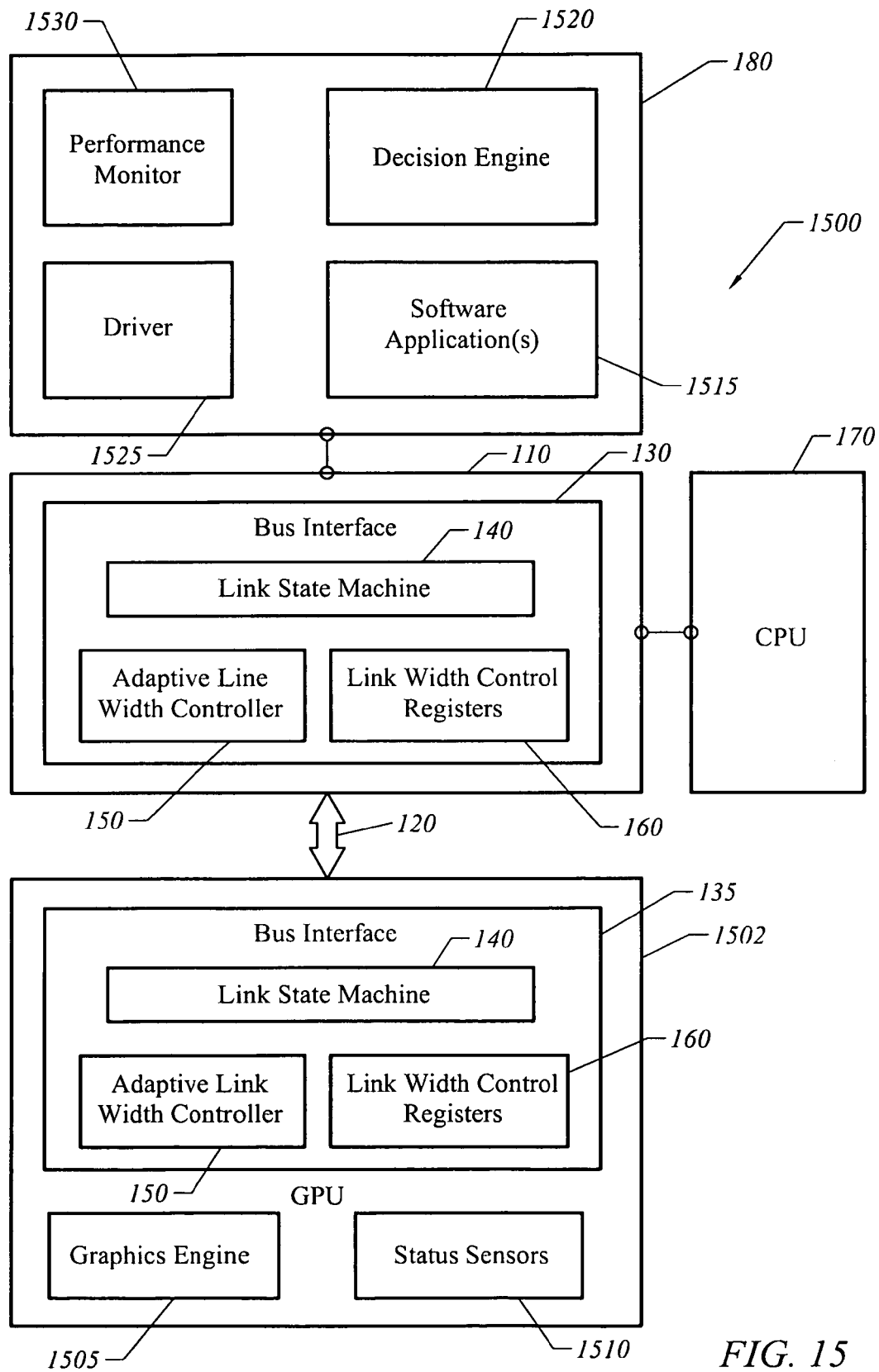
FIG. 15 is a block diagram of a system having dynamic link width resizing in accordance with one embodiment of the present invention.

FIG. 15 is a block diagram illustrating an embodiment of a graphics system 1500 having dynamic link resizing. Components with identical numbers to those in FIG. 1 have been previously described. In the embodiment of FIG. 15 the end point device is a graphics processing unit (GPU) 1502 having a graphics engine 1505. In one embodiment, GPU 1502 includes status sensors 1510 to measure temperature or other performance attributes of GPU 1502.

In a graphics system, such as graphics system 1500, there are many potential tradeoffs that can be made between link width and performance. Reducing the link width reduces power consumption (and hence heat generation) but also reduces the bus bandwidth, which may slow down the rate at which graphics system 1500 processes graphics applications. The benefit of reducing power consumption will further depend upon whether graphics system 1500 is operating off of battery power. A mobile graphics system operating off of battery power may, for example, require more aggressive power savings than if graphics system 1500 is powered by an external AC (wall-plug) power source. The disadvantages of reducing link width will depend, in part, on the state of the graphics engine 1505, the nature of the software applications 1515 being run (e.g., two-dimensional graphics programs tend to require transmission of less graphics data per unit time than three-dimensional graphics programs); system resources; and the degree to which a user is inconvenienced by a reduction in the rate with which graphics system 1500 processes graphics data when the link width is reduced.

In one embodiment, performance attributes of graphics system 1500 are monitored and used as a basis to make decisions to adjust the link width. In particular, two or more different operating states may be associated with different sets of performance attributes. As an illustrative example, graphics system 1500 may have an aggressive power saving operating state in which the link width is always reduced to a minimum level (e.g., one active data lane), a high performance operating state (i.e., all lanes active), and one or more intermediate operating states in which there is a tradeoff between power savings and performance (e.g., the number of active data lanes selected to be greater than one but less than the maximum number of operable data lanes).

Generally speaking, a by N link (having N active lanes) can be assigned N different operating states each having a different number of active data lanes and hence a different bandwidth and power consumption. As other examples of how the operating states may be assigned, a three-dimensional graphics application may be assigned more active data lanes than a two-dimensional graphics application due to the increased bandwidth required by the three-dimensional graphics application. As another example, when the graphics system is switched from an external power supply to a battery the number of active data lanes may be reduced to conserve power.

One example of performance attributes includes a class of system environment attributes, such as temperature (e.g., temperature in GPU 1502), user preferences (e.g., a user selection of a user preference between two or more different choices related to tradeoffs between power savings and performance), and a power mode (e.g., whether the system is in a low-power battery mode or a higher-power external power supply mode). Another example of performance attributes includes a class of system resource attributes, such as the type of loaded applications, resources requested from three dimensional graphics applications, resources requested from two-dimensional graphics applications, system main memory utilization, CPU power state, and the amount of available local and system memory. Another example of performance attributes includes a class of link profile attributes such as historical upstream memory writes, reads, and completion bandwidth; historical downstream memory writes, reads, and completion bandwidth; the number of flow control credits available for upstream write, read, and completion; the number of flow control credits available for downstream write, read, and completion; the number of upstream outstanding requests; the number of downstream outstanding requests, and the state of the graphics engine.

A decision engine 1520 reads the performance attributes, determines the operating state associated with the set of performance attributes, and then makes a decision whether the current operating state requires a change in the link width. For example, decision engine 1520 may determine whether a particular set of performance attributes corresponds to an operating state for which a change in bus link width would be advantageous.

If a change in link width is required, a driver 1525 generates the re-negotiation control signal sent to the RNC-TRL registers within registers 160. Decision engine 1520 may be implemented in hardware, software, or firmware.

In one embodiment, decision engine 1520 is implemented as a software module stored in memory 180. As one example, decision engine 1520 may include a table or mapping algorithm to map a set of performance attributes into operating states, with each operating state being assigned a pre-selected number of actove data lanes. The mapping is preferably made based on the current value of the performance attributes. However, it will be understood that decision engine 1520 may also employ a decision algorithm that performs a filtering operation to trigger a re-negotiation only for changes in performance attributes that are statistically likely to last for a minimum period of time, such as a time that is substantially greater than the time required to change the link width.

Decision engine 1520 may make decisions on a scheduled basis, such as on a periodic basis (e.g., after a pre-selected interval of time has elapsed) or after a pre-selected number of frames have been processed (e.g., once per frame). After decision engine 1520 determines that a change in the number of active data lanes is desirable, a re-negotiation signal is generated to trigger bus interface 130 to re-negotiate the number of active data lanes to the new number.

The performance attributes used by the decision engine 1520 to make link width decisions can be collected from within graphics system 1500 using conventional software or hardware reporting tools. In one embodiment a performance monitor 1530 monitors system performance including the performance of GPU 1502, CPU 170, and root component 110. Performance monitor 1530 may be implemented as a software module that provides information to decision engine 1520. Alternately, individual hardware registers may be configured to record performance attributes reported from components within system 1500 in a format that may be read by decision engine 1520.

Figure 16:
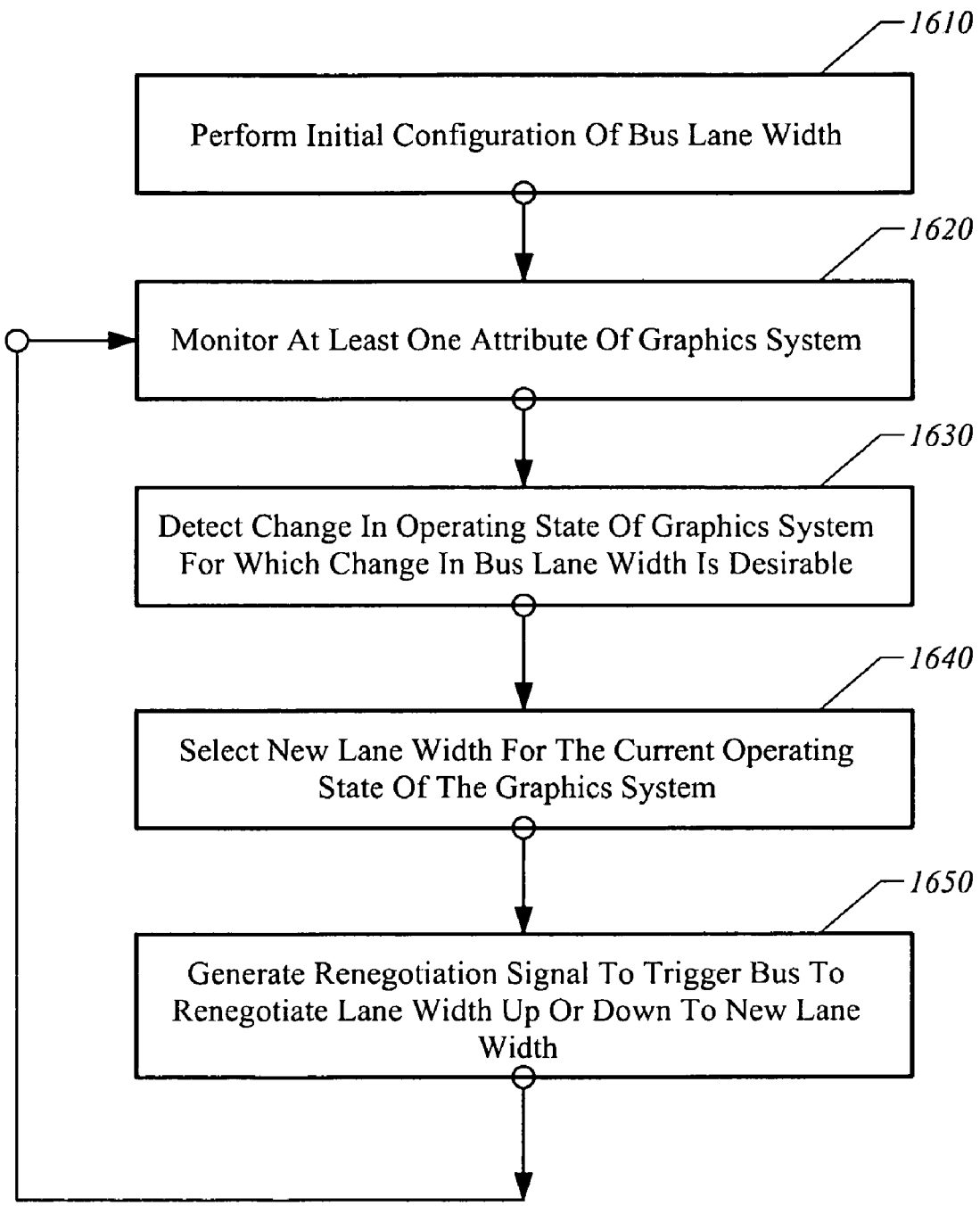
FIG. 16 is a flow chart illustrating a method of dynamically adapting bus link width in accordance with one embodiment of the present invention.

FIG. 16 is a flow chart illustrating a method of dynamically adjusting bus link width in accordance with one embodiment of the present invention. At some initial time, an initial configuration of bus link width is performed 1610. Thereafter, at least one performance attribute of the graphics system is monitored 1620. The decision engine 1520 then detects 1630 changes in the operating state of the graphics system for which a change in bus link width is desirable. The decision engine 1520 then selects 1640 a new link width for the current operating state of the graphics system. The decision engine 1520 then generates 1650 a re-negotiation signal (or signals) to trigger the bus interface to re-negotiate the link width to the new link width.

PCI Express™ version 1.1 is an interconnect technology standard developed by the PCI-SIG industry organization. PCI-SIG publishes version 1.1 as the "PCI Express Base Specification Revision 1.1," the contents of which are hereby incorporated by reference. The state diagrams of PCI Express™ (PCI-E) version 1.1 are substantially identical to those in version 1.0. However, section 4.2.6.3.1.1 includes a modification to the configuration sub-states illustrated above in FIG. 8. In particular, in the Configuration.Linkwidth.Start sub-state the transmitter portion of a bus interface sends TS1 ordered sets with selected link numbers and sets lane numbers to PAD on all downstream lanes that detected a receiver during the Detect state.

Figure 17:
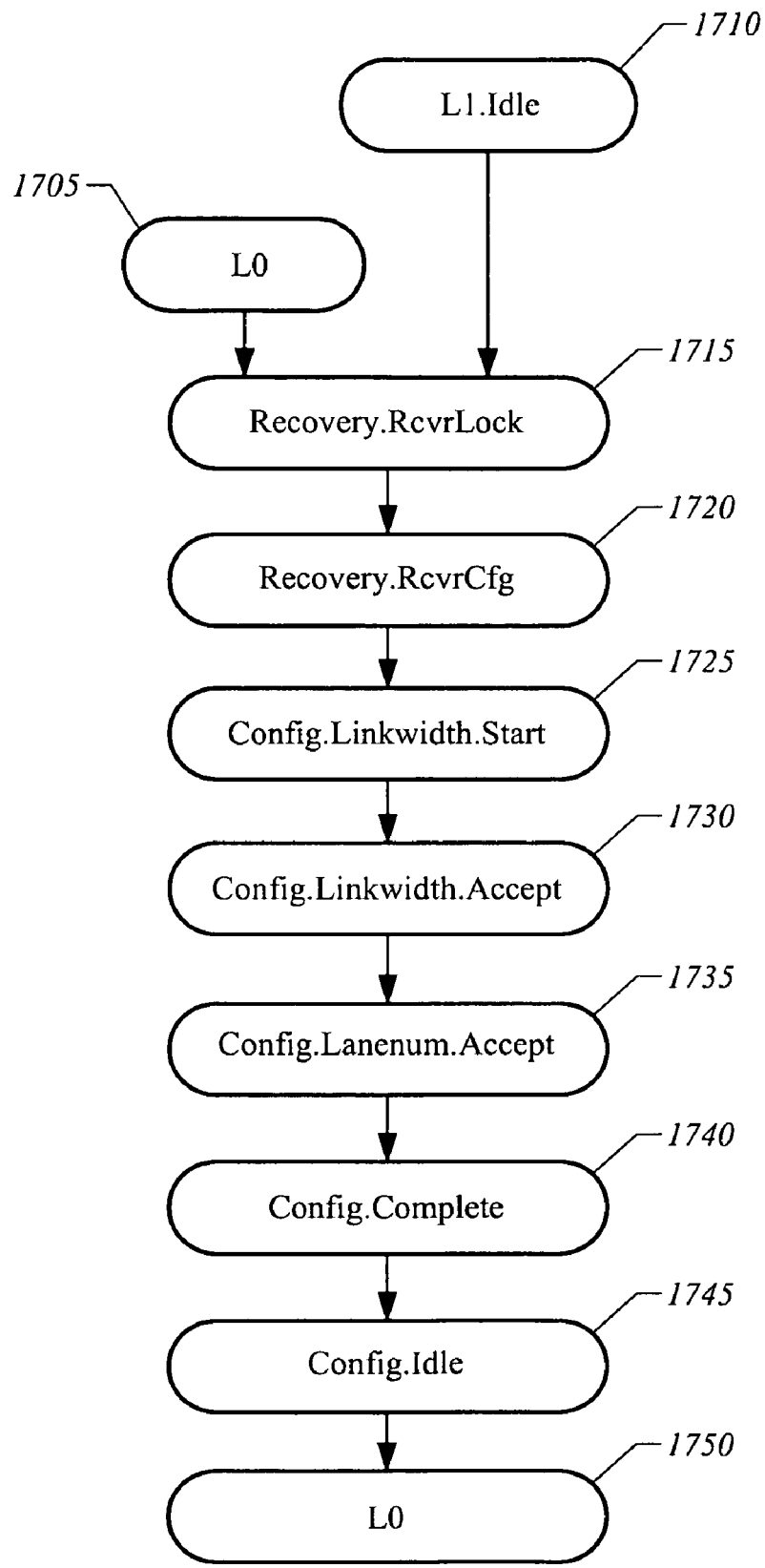
FIG. 17 is a flow chart illustrating a method of adapting bus bandwidth in accordance with one embodiment of the present invention.

FIG. 17 is a flowchart illustrating a method of dynamically selecting link width that is compliant with the PCI-E version 1.1 specification. The sub-states are substantially identical to those described above in regards to FIGS. 8 and 9. As previously described each of the serial data lanes 120 corresponds to a pair of serial simplex data links to transmit and receive data. As previously described, the PCI-E protocol utilizes training sets (TSs) that include TS1 and TS2 training sets in which a transmitter portion of bus interface 130 sends a TS to a link partner and receives reply TSs sent by the link partner 135 in a receiver portion of the bus interface.

In one embodiment, a recovery process is used to retrain the link width. As illustrated in FIG. 17, the recovery process can be initiated either when a link is a normal L0 state 1705 or in a low power L1 state 1710. In either the L0 state 1705 or the L1 state 1710 the link is directed into recovery by link width controller 150 of bus interface 130. In a Recovery.RcvrLock state 1715, link width controller 150 of bus interface 130 enables any previously disabled lanes between bus interface 130 and its corresponding link partner (e.g., bus interface 135). In one embodiment link width controller 150 of bus interface 130 wakes up data lanes within a short time period of entering recovery in order to minimize link resizing time. In the Recovery.RcverLock state 1715 bus interface 130 sends TS1 training sets with valid link and lane numbers and bus interface 130 then looks for consecutive training sets at its receivers.

The system enters the Recover.RcvrCfg state 1720 and bus interface 130 sends TS2 training sets with valid link and lane numbers to link partner 135. Bus interface 130 then looks for consecutive TS2 training sets in its receivers.

Link width controller 150 in bus interface 130 waits a sufficient length of time for all data lanes to be fully enabled and stable before moving to a Config.Linkwidth.Start state 1725. In Config.Linkwidth.Start state 1725 bus interface 130 sends TS1 training sets with PAD link and lane numbers on all lanes that detected receivers during the Detect state. Bus interface 130 looks for TS1 training sets with valid link and PAD lane numbers at its receivers. In one embodiment, bus interface 130 is configured to reduce the chance of false locks while the initial training sets from the link partner stabilize. In this embodiment, bus interface 130 goes into a Config.Linkwidth.Start.Wait sub state for a programmable number of initial training sets to avoid a false lock. The programmable number of initial training sets is a filter period. After the filter period has expired, bus interface 130 starts symbol locking to the received training set from link partner 135.

The system then enters the Config.Linkwidth.Accept state 1730. Link width controller 150 in bus interface 130 returns valid link numbers only on selected lanes in order to force link partner 135 to train to the link width selected by the decision engine. Bus interface 130 sends TS1 training sets with valid link and PAD lane numbers on the selected lanes and looks for TS1 training sets with valid link and lane numbers at its receivers.

The remaining states progress in accordance with the PCI-E protocol. In the Config.Lanenum.Wait state 1735, bus interface 130 sends TS1 training sets with valid link and valid lane numbers on the selected lanes and looks for two TS2 training sets at its receivers. In the Config.Complete state 1740, bus interface 130 sends TS2 training sets with valid link and valid lane numbers on selected lanes and looks for TS2 training sets with valid link and lane numbers. In the Config.Idle state bus interface 130 sends idle data symbols on selected lanes and looks for idle symbols at its receivers. The system then exits 1750 with the link width set to the new link width.

From the previous description it will be understood that the link width may be adjusted up or down during operation of a graphics system to achieve a useful tradeoff between power savings and performance. During normal operation the decision engine will automatically adjust the link bandwidth without requiring intervention by the end user. This is particularly advantageous in applications where the required bandwidth changes over time. As one example, in a mobile application the link width may be reduced to save power while also permitting the link width to be automatically increased as required based upon the demands of the graphics system and the preferences of the user. Moreover, embodiments of the present invention permit the link bandwidth to be adjusted on a time scale corresponding to a fraction of a second, which is rapid compared with the frame rates of many graphics systems. Consequently, the link bandwidth can be dynamically adjusted to continuously adapt to changes in the operating state of the graphics system.

While embodiments of the present invention have been described in regards to examples in which an operating state of a graphics system are monitored, more generally the present invention may be applied to other types of systems as well.

Figure 18:
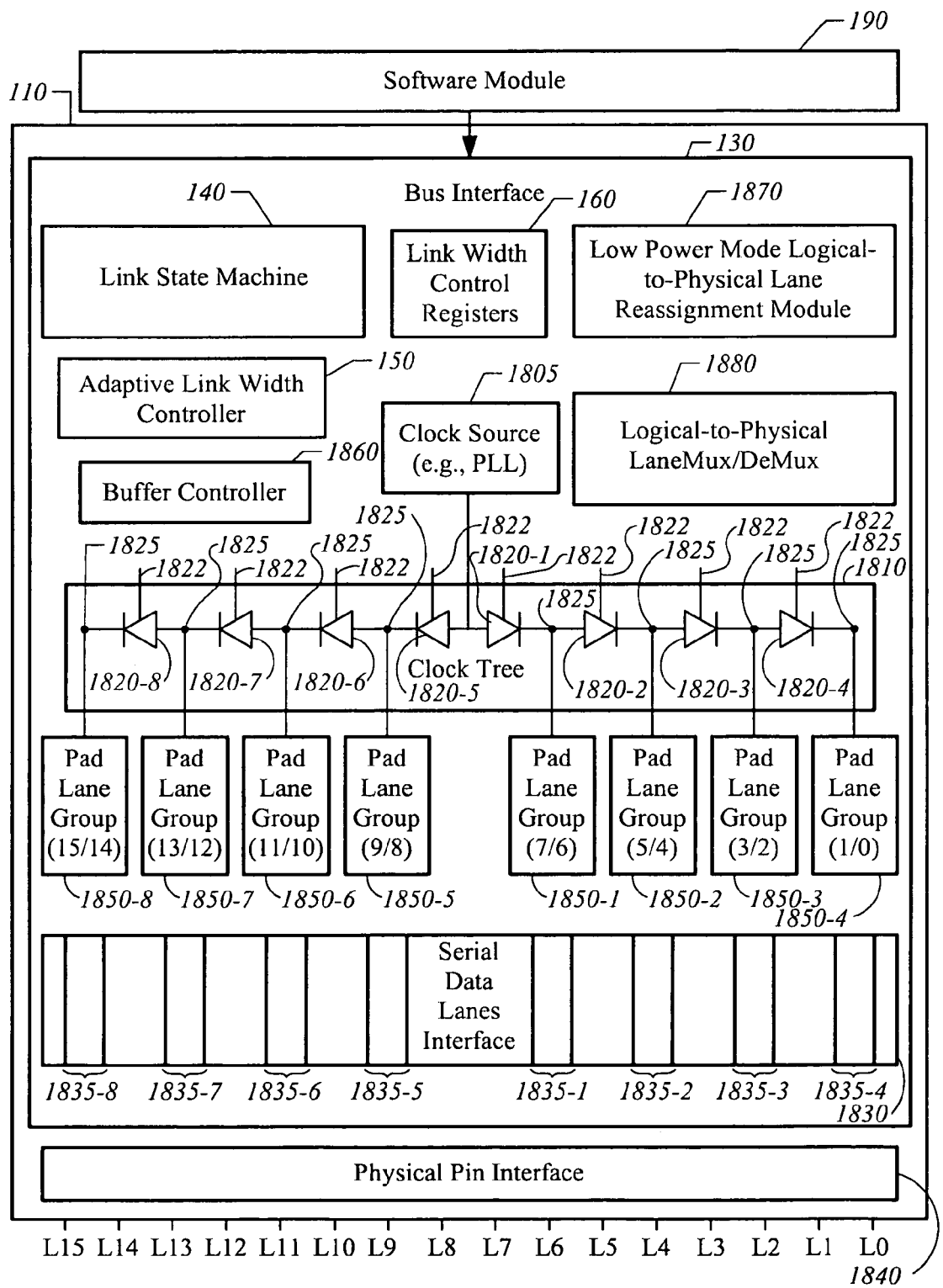
FIG. 18 is a block diagram of a bus interface for reducing clock power consumption in accordance with one embodiment of the present invention.

Referring to FIG. 18, in one embodiment of the present invention bus interface 130 is configured to reduce clock power dissipation. Each active data lane 1835 in bus interface 130 requires clocking signals. For example, the transmitter portion of each data lane requires clocking signals to generate an embedded clock. The data lanes 1835 have corresponding physical pin-out locations set by manufacturing and connector pin layout considerations. As an illustrative example, FIG. 18 is illustrated with pin outs for 16 physical lanes L0 to L15. Typically a phase locked loop (PLL) is used as a clock source 1805 to generate the clock signals from a central location with respect to the data lanes 1835 and clock buffers 1820 are used to distribute the clock signals using a clock tree 1810. However, generating clock signals at all tap points 1825 (i.e., distribution nodes) of clock tree 1810 wastes power when bus interface 130 is in a mode in which only a small subset of data lanes 1835 (e.g., one lane) are active. Therefore according to one embodiment of the present invention clocking signals are selectively supplied to only the active data lanes. Thus, the clock power consumption is reduced in a system in which the number of active data lanes is variable. In one embodiment, an assignment of the data lanes that are selected to be active is made to permit the number of active clock buffers to be reduced.

One difficulty associated with selectively supplying clocking signals to active data lanes is that bus standards, such as PCI Express™, have pin out conventions and lane negotiation conventions that make it difficult to reduce clock power consumption when a small number of data lanes 1835 are active. As previously described, the PCI Express™ bus supports 1× [2.5 Gbps], 2×, 8×, 12×, 16×, and 32× bus widths, where the widths correspond to transmitter and receiver differential pairs known as data lanes and "x" indicates the multiplication factor to the total bandwidth afforded by using multiple data lanes.

There are also corresponding standard PCI Express connector types and pin outs. For example, there is a PCI Express™ 1× pin out, a PCI Express™ 4× pin out, a PCI Express™ 8× pin out, and a PCI Express™ 16× pin out. The standard pin outs typically arrange pins for the transmitter and receiver pairs of the data lanes in a sequence e.g., for a 16× pin out, the pin out is arranged to have receiver and transmitter pins arranged in the sequence of lane 0, lane 1, lane 2 . . . lane 15.

In one convention, the negotiation of data lanes in a PCI Express™ bus has a default logical order for specific modes. In particular, one default logical order is that lane 0 is selected as the default when only a single data lane is active. This has the effect that when only a single lane is active that the single lane that is utilized is located at an outermost lane with respect to center of the clock tree 1810. Consequently, all of the clock buffers 1820 in a clock tree 1810 between the central location of the clock source and lane 0 must remain active to provide clock signals to lane 0. Thus, even though only lane 0 is active, a large portion of the clock tree 1810 must remain in an active, high power dissipation state in order to provide clock signals to lane 0.

In one embodiment of bus interface 130, the power dissipated by clock tree 1810 is reduced by selectively placing clock buffers 1820 driving data lanes 1835 that are inactive into a quiescent, inactive state having reduced power consumption. Each clock buffer 1820 includes a control signal input 1822 to control whether the buffer is in an active or inactive state. A buffer controller 1860 controls which of the buffers 1820 are in an active state or in the quiescent state.

Bus interface 130 includes a serial data lane interface 1830 and a physical pin interface 1840. The serial data lane interface 1830 may, for example, include the transmitter and receiver pairs, receiver and transmitter signal interfaces, and other associated electronics for establishing serial data lanes 1835.

Clock tree 1810 may, for example, be a linear clock tree having two branches 1812 and 1814 (illustrated in FIG. 19) connected to a central clock source 1805. Each branch 1812 and 1814 corresponds to a chain of buffers 1820 connected in series with taps 1825 provided at nodes of the chain to drive pads 1850. Such a configuration is comparatively simple and provides other advantages, such as minimizing clock skew. In one embodiment, each buffer 1820 provides clock signals to a pad 1850 which supplies clock signals to two data lanes 1835. Consequently, in one embodiment a clock tree 1810 with eight buffers 1820-1, 1820-2, 1820-3, 1820-4, 1820-5, 1920-6, 1820-7, and 1820-8 provides clock signals to eight pads 1850-1, 1850-2, 1850-3, 1850-4, 1850-5, 1850-6, 1850-7, and 1850-8 and hence sixteen data lanes 1835.

In one embodiment, a logical-to-physical lane reassignment module 1870 is included to perform a reassignment between logical lane numbers and physical lane numbers. This permits the physical data lanes to be assigned in a manner that permits a maximum reduction in clock power consumption while still maintaining an arbitrary logical assignment of lanes. Thus, for an example, a logical lane zero can be assigned to any one of the physical lanes 1835 to reduce the number of clock buffers that must be maintained in an active state. An associated Mux/Demux unit 1880 provides for swizzling of signals to interface between the logical domain and the physical domain. As an illustrative example, a lane reassignment can be performed that retains a logical set of default lanes but with an assignment of physical lanes that permits a maximum number of clock buffers 1820 to be placed into a quiescent mode for increased power savings. For example, a logical lane 0 may be implemented using a different physical lane, such as a center-most physical lane (e.g., physical lane 7).

Figure 19:
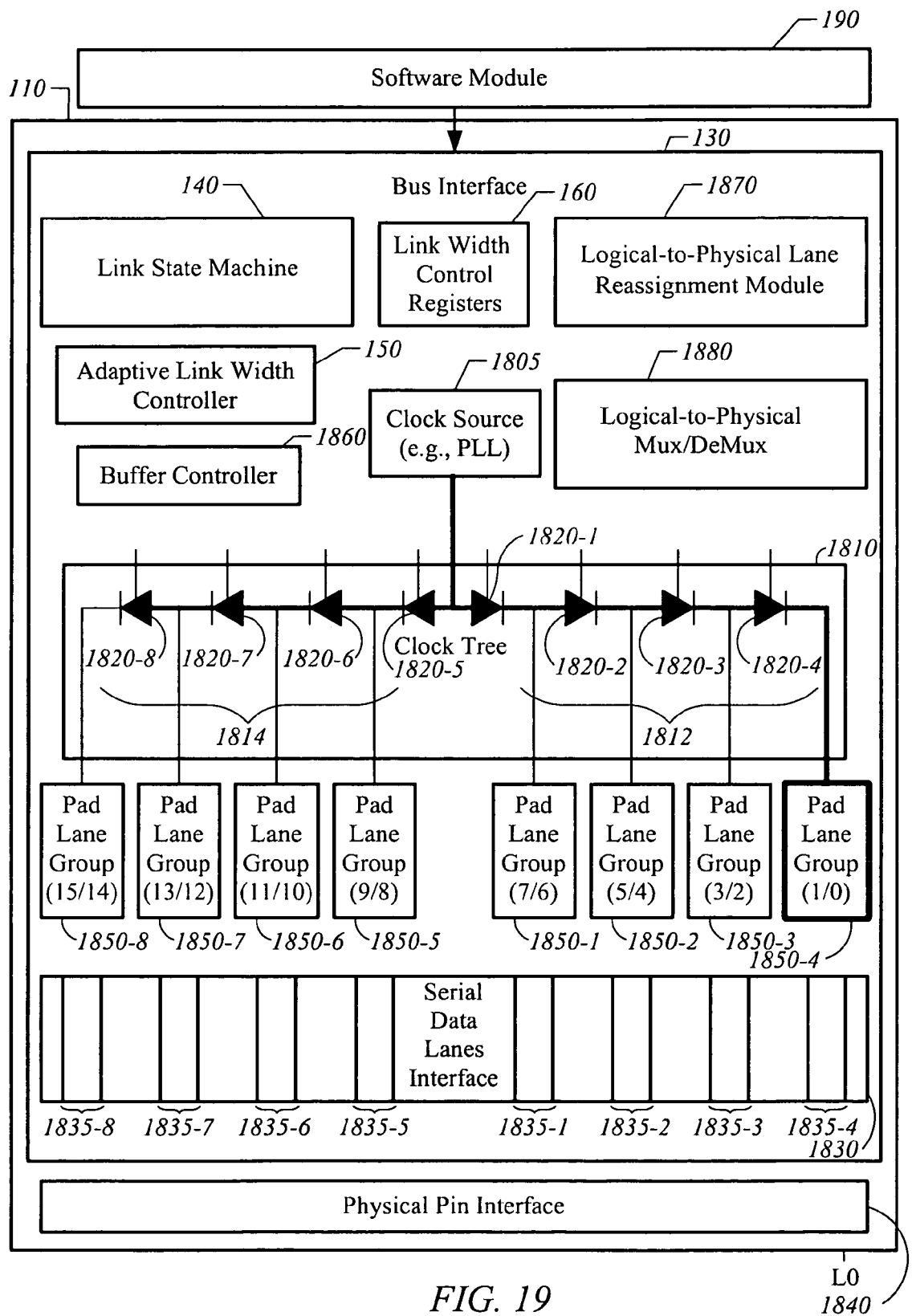
FIGS. 19-20 illustrate the reduction in clock buffer permitted by a logical-to-physical lane reassignment in the bus interface of FIG. 18.
Figure 20:
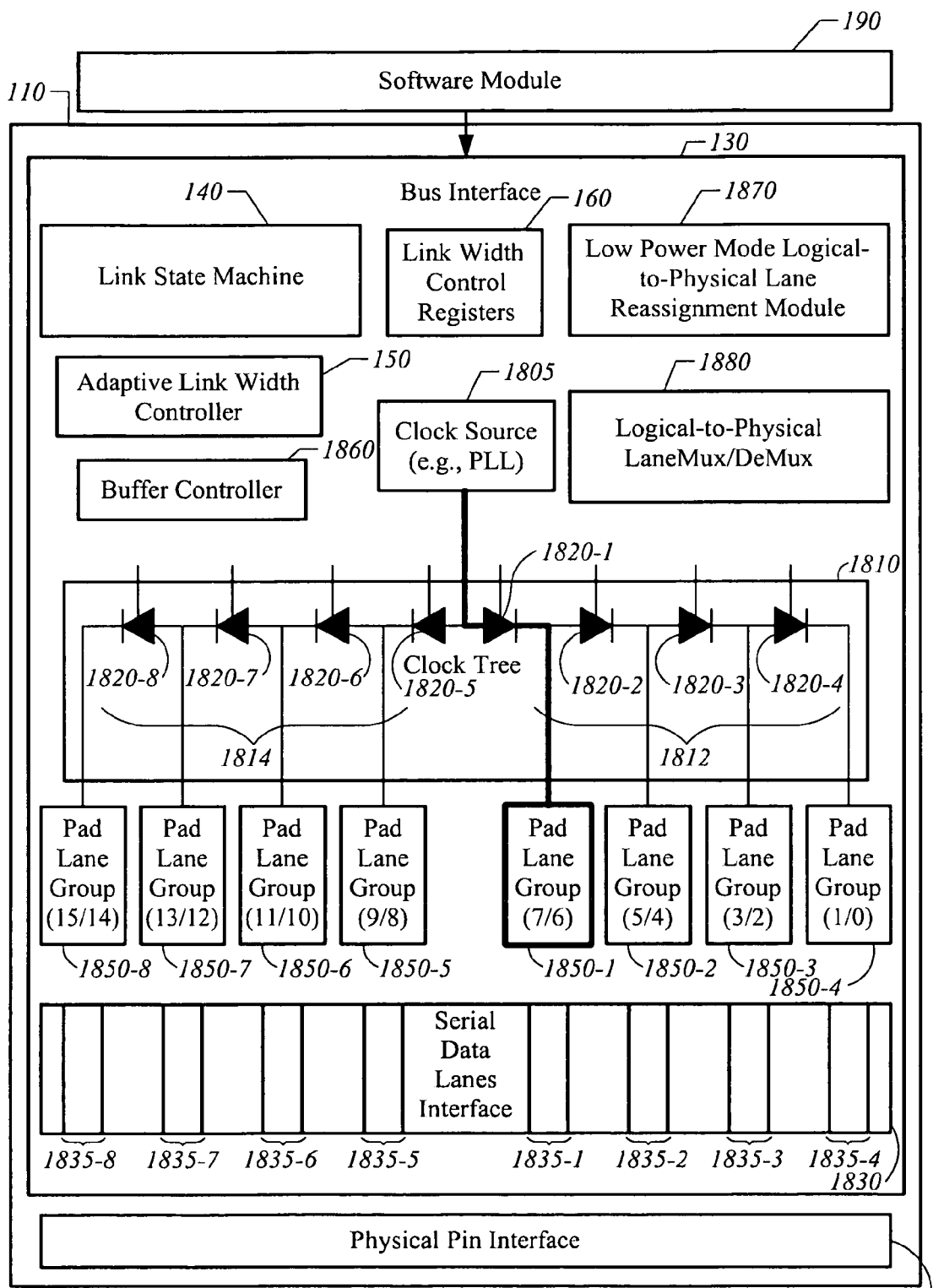

FIGS. 19 and 20 illustrate some of the power savings afforded by logical-to-physical lane reassignment. FIG. 19 illustrates an example with no logical-to-physical lane reassignment in which only one or more lanes associated with pad 1850-4 have active data lanes. Pad 1850-4 is illustrated as providing clock signals to lanes 0 and 1. As illustrated by the shading of the buffers and the outline around pad 1850-4, in a conventional clock tree all of the clock buffers 1820-1, 1820-2, 1820-3, 1820-4, in the right hand branch 1812 of clock tree 1810 must remain active even though only lane 0 is active. Because there is no logical-to-physical reassignment in this example, one possible power savings is to place the clock buffers 1820-5, 1820-6, 1820-7, and 1820-8 in left hand branch 1814 into an inactive state when only lane 0 in right hand branch 1812 is active.

FIG. 20 illustrates an example in which a logical lane 0 is assigned to a physical lane closer to the center of the clock tree. in this example, a logical lane 0 is mapped onto a physical lane 6 or 7 driven from pad 1850-1. As a result, clock buffers 1820-2, 1820-3, and 1820-4 in the right hand branch 1812 of clock tree 1810 may be placed into an inactive state, as indicated by the lack of shading. The clock buffers 1820-5, 1820-6, 1820-7, and 1820-8 in left hand branch 1814 may also be placed in an inactive state.

In one implementation, a vendor ID code is inserted into a component, such as component 110, to indicate that the clock buffer power minimization and logical-to-physical lane reassignment is supported. This permits a negotiation to be held between components in which each component will negotiate a small number of logical lanes to have an assignment of physical lanes that permits clock buffer power to be minimized. Alternatively, in a direct embodiment an entity, such as software module 190, may command components to perform a logical-to-physical lane reassignment whenever it permits a significant reduction in clock buffer power.

Figure 21:
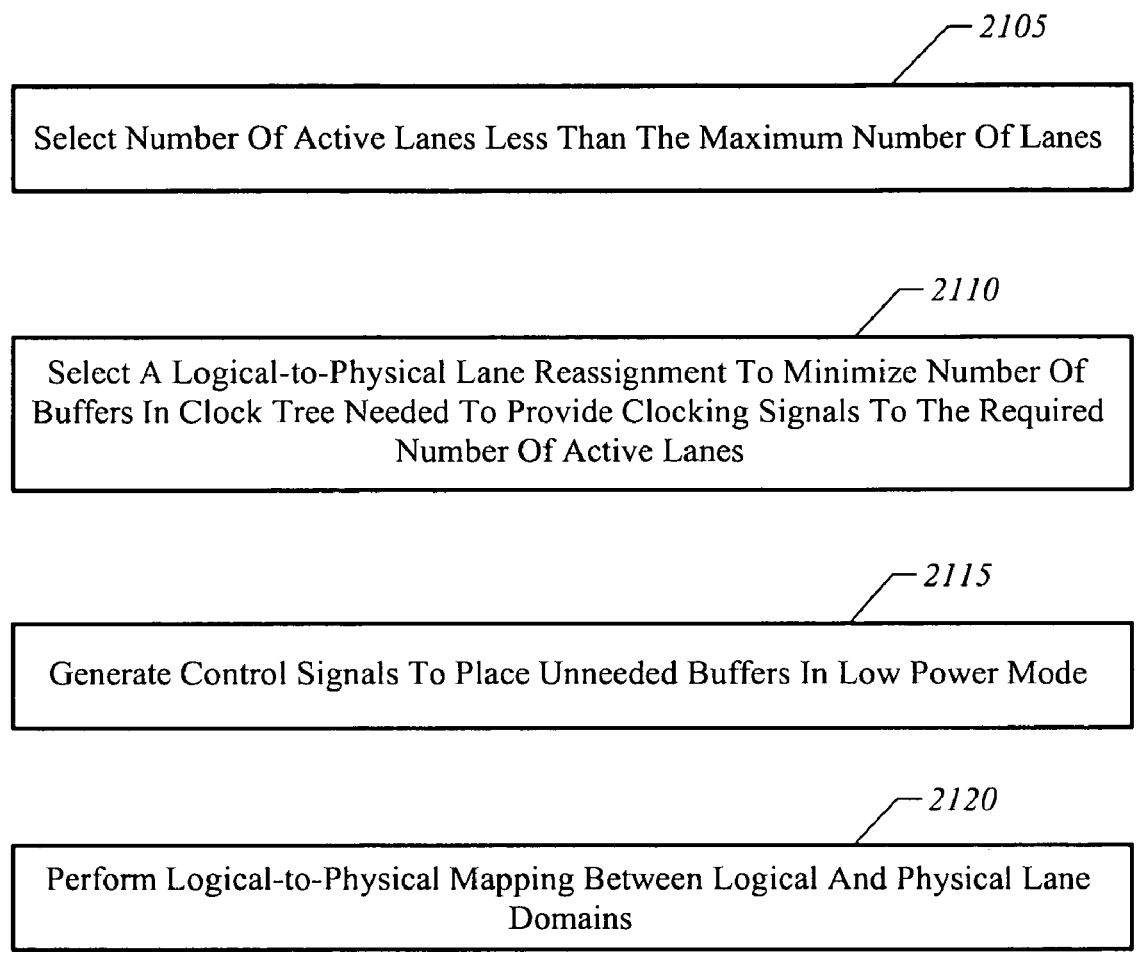
FIG. 21 is a flowchart of a method of reducing clock power in accordance with one embodiment of the present invention.

FIG. 21 is a flow chart of an exemplary process for reducing clock power. The number of active data lanes is selected 2105 to be a number less than the maximum number of lanes. A logical-to-physical lane reassignment is selected 2110 to reduce the number of clock buffers 1820 in the clock tree 1810 required to drive the active data lanes. In particular, the physical data lanes that are used as active data lanes may be selected to be the centermost data lanes. Controls signals are generated 2115 to place unneeded buffers in an inactive, low power mode. The control signals may come from software module 190. Alternatively, the control signals may be generated from buffer controller 1860 acting in response to information from adaptive link width controller 150. Additional logical-to-physical mapping may be performed 2120 using a mux/demux unit to perform data swizzling to compensate for the lane reassignment.

Figure 22:
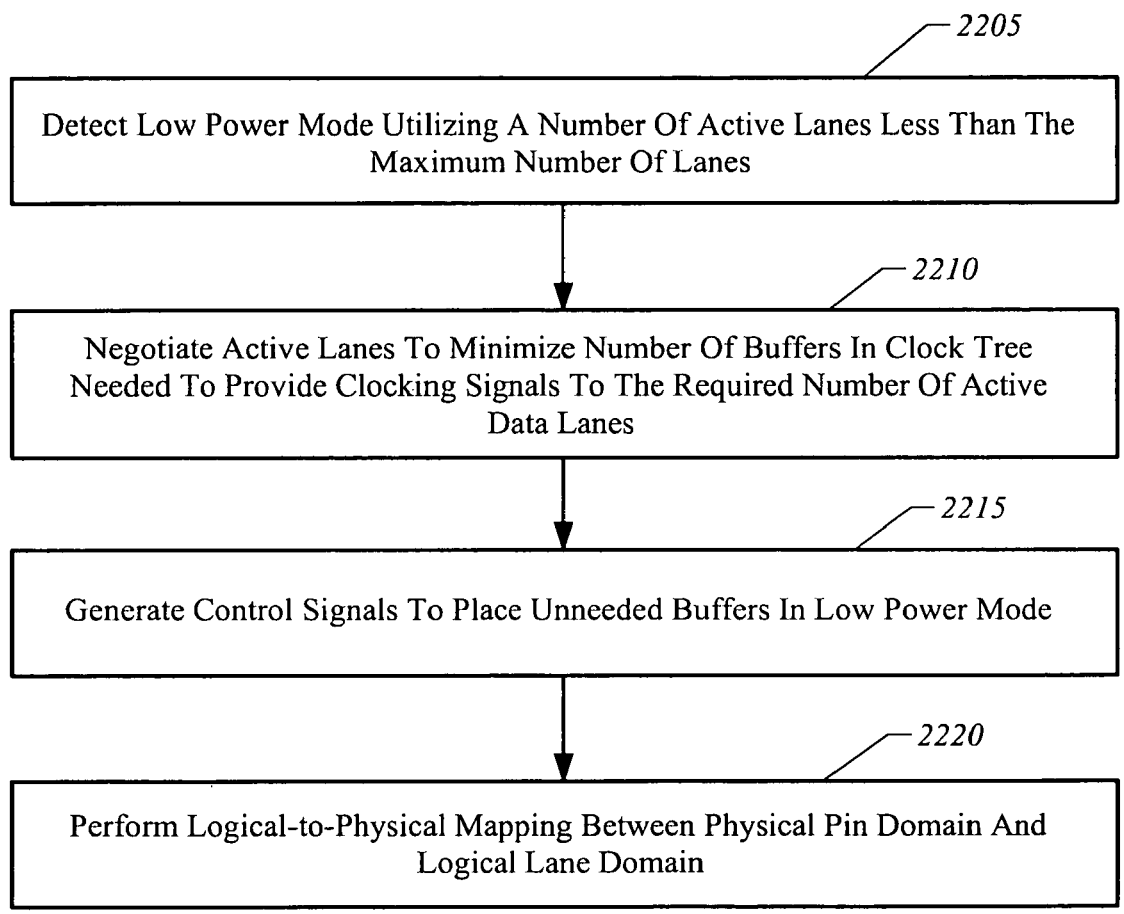
FIG. 22 is a flowchart of a method of reducing clock power in accordance with one embodiment of the present invention.

FIG. 22 is a flow chart of another exemplary process for reducing clock power. An entity within bus interface 130 detects 2205 that the bus interface is operating in a low power mode that utilizes a number of data lanes less than the maximum number of lanes, such as a single lane. The bus interface then negotiates 2210 with a bus interface of another component a set of active data lanes that permits the number of active clock buffers to be minimized. In particular, the bus interface may negotiate to use the centermost physical data lanes. The bus interface then generates 2215 control signals to place the unneeded clock buffers in a low power, inactive state. Any necessary logical-to-physical lane mapping is performed 2220 to account for changes in lanes that are different than a standard physical lane assignment.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A bus interface for an integrated circuit, comprising:
a plurality of serial data lanes in which each serial data lane that is active requires a clock signal for operation;
a link state machine for implementing a bus protocol to associate said serial data lanes to form a data link with a corresponding bus interface of a link partner;
a link width controller for adjusting the link width of said data link;
a clock tree having a sequence of clock buffers and taps for distributing clock signals from a master clock to said plurality of serial data lanes; and
a buffer controller controlling individual clock buffers in said clock tree;
said bus interface having a mode of operation in which, for a link width less than a maximum link width, clock buffers not required to service active data lanes are placed in a quiescent state;
wherein for said mode of operation said bus interface generates an assignment of active data lanes to reduce clock buffer power in which a logical-to-physical lane reassignment is performed to reduce the number of buffers required to be in an active state while maintaining a logical assignment of data lanes.

2. The bus interface of claim 1, wherein said clock tree has two branches and one branch of said clock tree is placed in a quiescent state in said mode of operation.

3. The bus interface of claim 1, wherein for said mode of operation the number of active data lanes is reduced to one lane that is a logical lane zero and said assignment includes assigning the logical lane zero to a physical lane that requires the smallest number of active clock buffers.

4. The bus interface of claim 3, wherein the logical lane zero is assigned to a physical lane proximate a center source of said clock tree.

5. The bus interface of claim 4, wherein said mode of operation is a low power mode and said clock tree branches into two chains of buffers from the center source of said clock tree and further wherein said bus interface has a default mode when said bus interface is not operating in said low power mode in which the logical lane zero is assigned to physical lane zero disposed at a distal end of one of said chains of buffers and for a link width corresponding to a single lane in said low power mode, the logical lane zero is assigned to a physical lane proximate the center source of said clock tree.

6. The bus interface of claim 5, further comprising a mux/demux unit to perform data swizzling between the logical and physical lane domains.

7. A bus interface for an integrated circuit, comprising:
a plurality of serial data lanes in which each serial data lane that is active requires a clock signal for operation;
a link state machine for implementing a bus protocol to associate said serial data lanes to form a data link with a corresponding bus interface of a link partner;
a link width controller for adjusting the link width of said data link;
a clock tree having a sequence of clock buffers and taps for distributing clock signals from a master clock to said plurality of serial data lanes; and
a buffer controller controlling individual clock buffers in said clock tree;
said bus interface having a mode of operation in which, for a link width less than a maximum link width, clock buffers not required to service active data lanes are placed in a quiescent state;
wherein said clock tree is a linear clock tree having a center source of clock signals driving two chains of buffers and said bus interface has a default mode in which a physical lane for a lane zero of said bus protocol is disposed at a distal end of one of said chain of buffers, a low power mode corresponding to performing an assignment of a logical lane zero to a physical lane requiring a reduced number of active clock buffers.

8. The bus interface of claim 7, wherein said bus interface has a mode of operation in which each buffer of one of said chains of buffers is placed in a quiescent mode.

9. The bus interface of claim 7, wherein for the low power mode the number of active data lanes is reduced to one lane that is the logical lane zero, the logical lane zero being assigned to a physical lane requiring the smallest number of active clock buffers.

10. The bus interface of claim 9, wherein the logical lane zero is assigned to a physical lane proximate the center source of said clock tree.

11. A bus interface for an integrated circuit, comprising:
a plurality of serial data lanes in which each serial data lane that is active requires a clock signal for operation;
a link state machine for implementing a bus protocol to associate said serial data lanes to form a data link with a corresponding bus interface of a link partner;
a link width controller for adjusting the link width of said data link;
a clock tree having a sequence of clock buffers and taps for distributing clock signals from a master clock to said plurality of serial data lanes; and
a buffer controller controlling individual clock buffers in said clock tree;
said bus interface having a mode of operation in which, for a link width less than a maximum link width, clock buffers not required to service active data lanes are placed in a quiescent state;
wherein for a change in operating state corresponding to changing a power source of said system from an external source to an internal battery, reducing the number of active data lanes to one lane to reduce power consumption;

wherein said one lane is a logical lane zero assigned to a physical lane selected to permit a reduction in the number of clock buffers required to drive said one lane.

12. The bus interface of claim 11, wherein said bus interface is operable to receive a command to adjust the link width to a new link width in which said bus interface negotiates said new link width to have a lane assignment selected to reduce the number of clock buffers required to be active.

13. A system, comprising:
- a data bus having a plurality of serial data lanes capable of being associated into a link with a link partner, said data bus configuring a link having a set of said plurality of serial data lanes operative as active data lanes;
- a clock tree for generating clock signals distributed through a sequence of clock buffers to each active data lane; and
- a buffer controller for controlling individual buffers of said clock tree;
- said system configured such that clock buffers of said clock tree not required to drive active lanes are selected to be in a quiescent state such that clock power dissipation is reduced for a low power mode having a link width less than a maximum link width;
- wherein for a link width corresponding to a single lane, a logical lane zero is assigned to a different physical lane requiring a smaller number of active clock buffers than the physical lane zero associated with operation for the maximum link width.

14. The system of claim 13, wherein said system receives a re-negotiation signal identifying a number of active data lanes and said data bus prepares any operable serial data lanes of said data bus which were disabled in a previous configuration for negotiation prior to negotiating the number of active data lanes to the number determined by said re-negotiation signal.

15. The system of claim 13, wherein the logical lane zero is assigned to a physical lane proximate a center source of a clock tree requiring the smallest number of active clock buffers.

16. The system of claim 13, wherein said clock tree comprises a linear clock tree having a central clock source driving two chains of buffers and buffers not required to drive active lanes are placed in a quiescent state.

17. A method of reducing bus power for a data bus having a plurality of serial data lanes, each serial data lane requiring a clock signal from a clock tree to be in an active state, comprising:
- associating a subset of said plurality of serial data lanes into a link with a link partner; and
- placing clock buffers of said clock tree not required to provide clock signals to active data lanes into a quiescent state
- wherein a logical lane zero is assigned to a physical lane proximate a center of said clock tree.

18. The method of claim 17, further comprising:
- assigning active data lanes to reduce the number of clock buffers required to be in an active state.

\* \* \* \* \*